April 4, 1961 R. D. STAYTON ET AL 2,978,085
VENDING MACHINE
Filed April 24, 1951 20 Sheets-Sheet 1

INVENTORS
Robert D. Stayton
Ned E. Lowry
Leon O. Vogt
By: Moore, Olson & Trexler Attys.

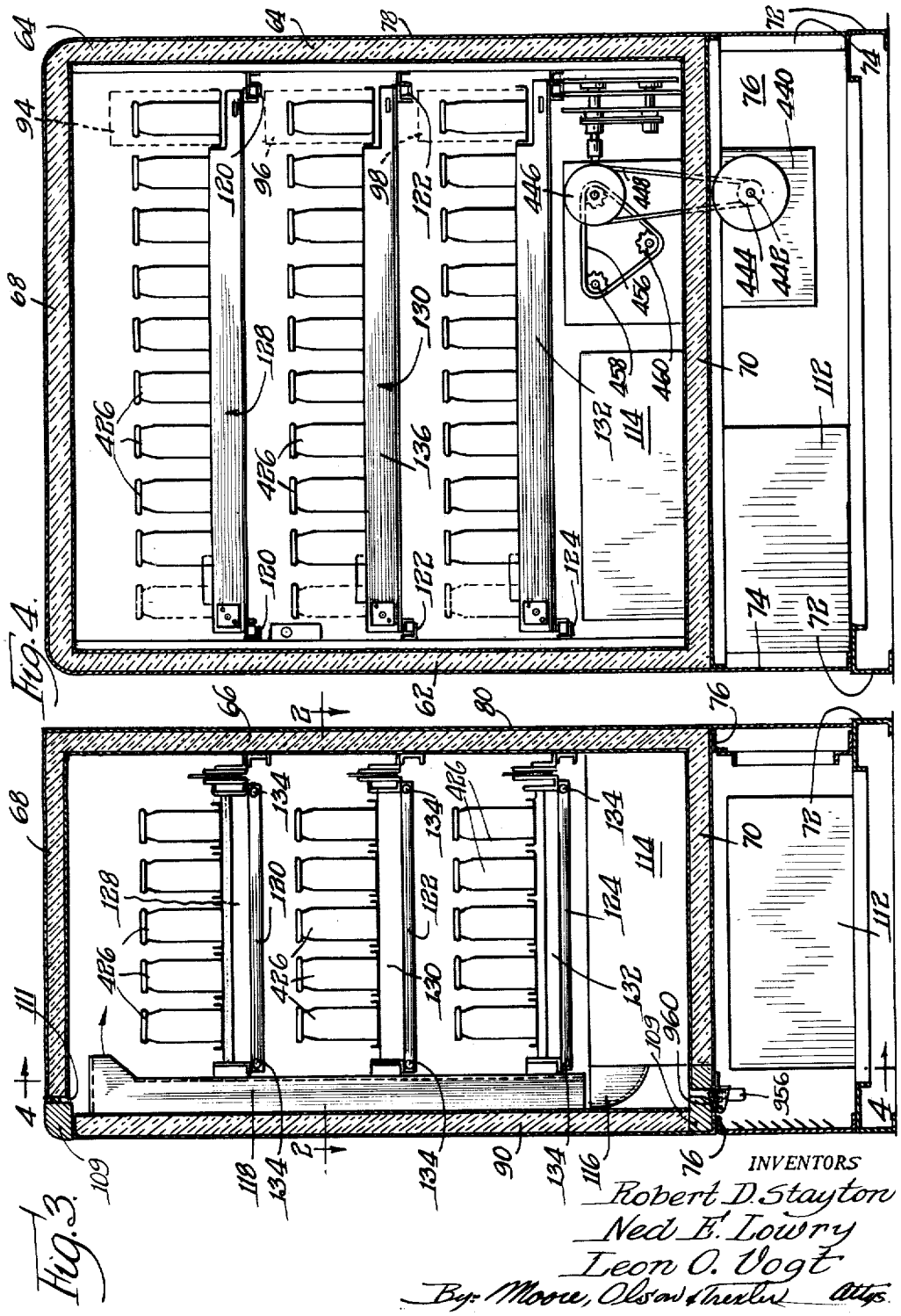

April 4, 1961 R. D. STAYTON ET AL 2,978,085
VENDING MACHINE
Filed April 24, 1951 20 Sheets-Sheet 3

INVENTORS.
Robert D. Stayton
Ned E. Lowry
Leon O. Vogt
By: Moore, Olson & Trexler Attys.

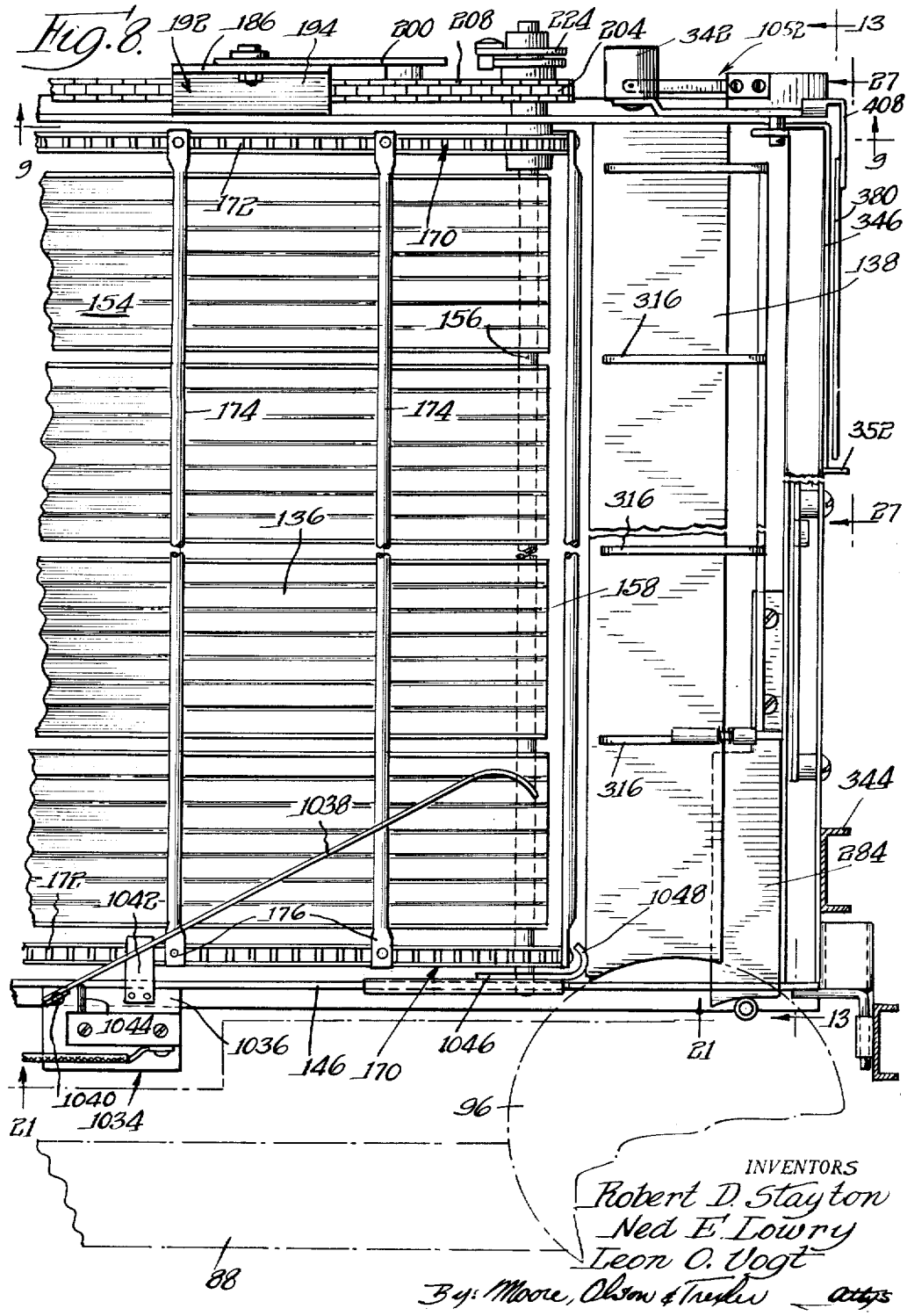

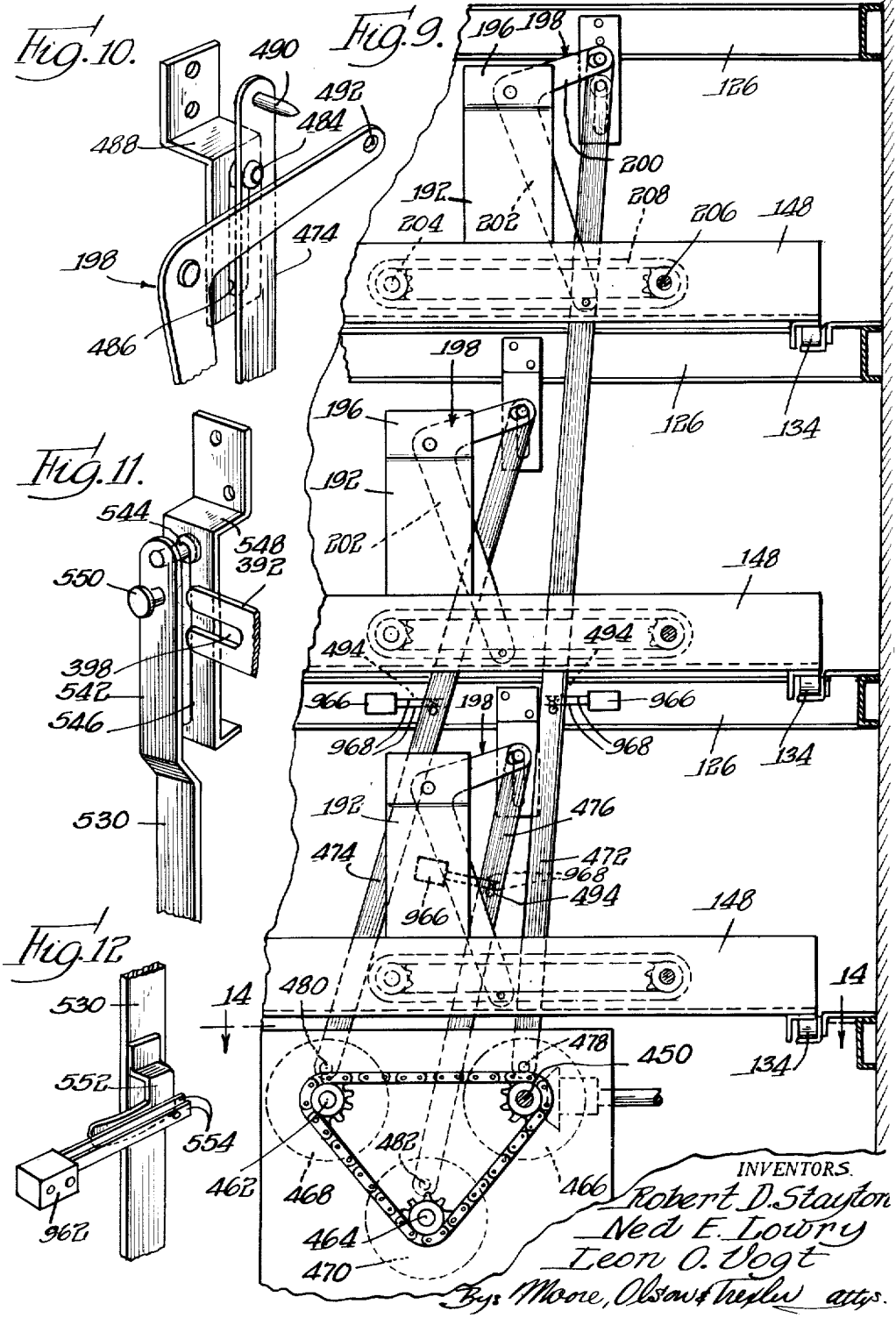

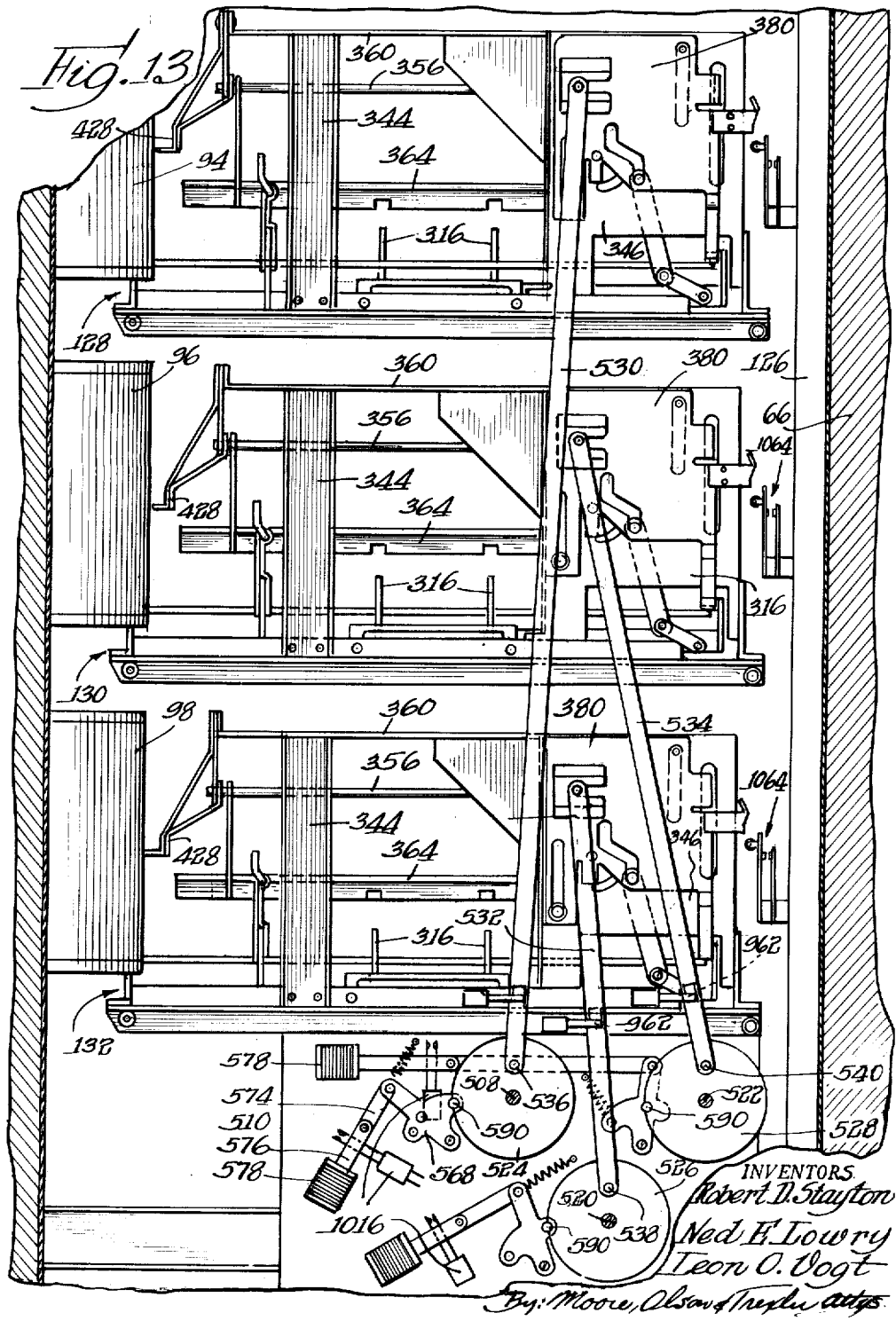

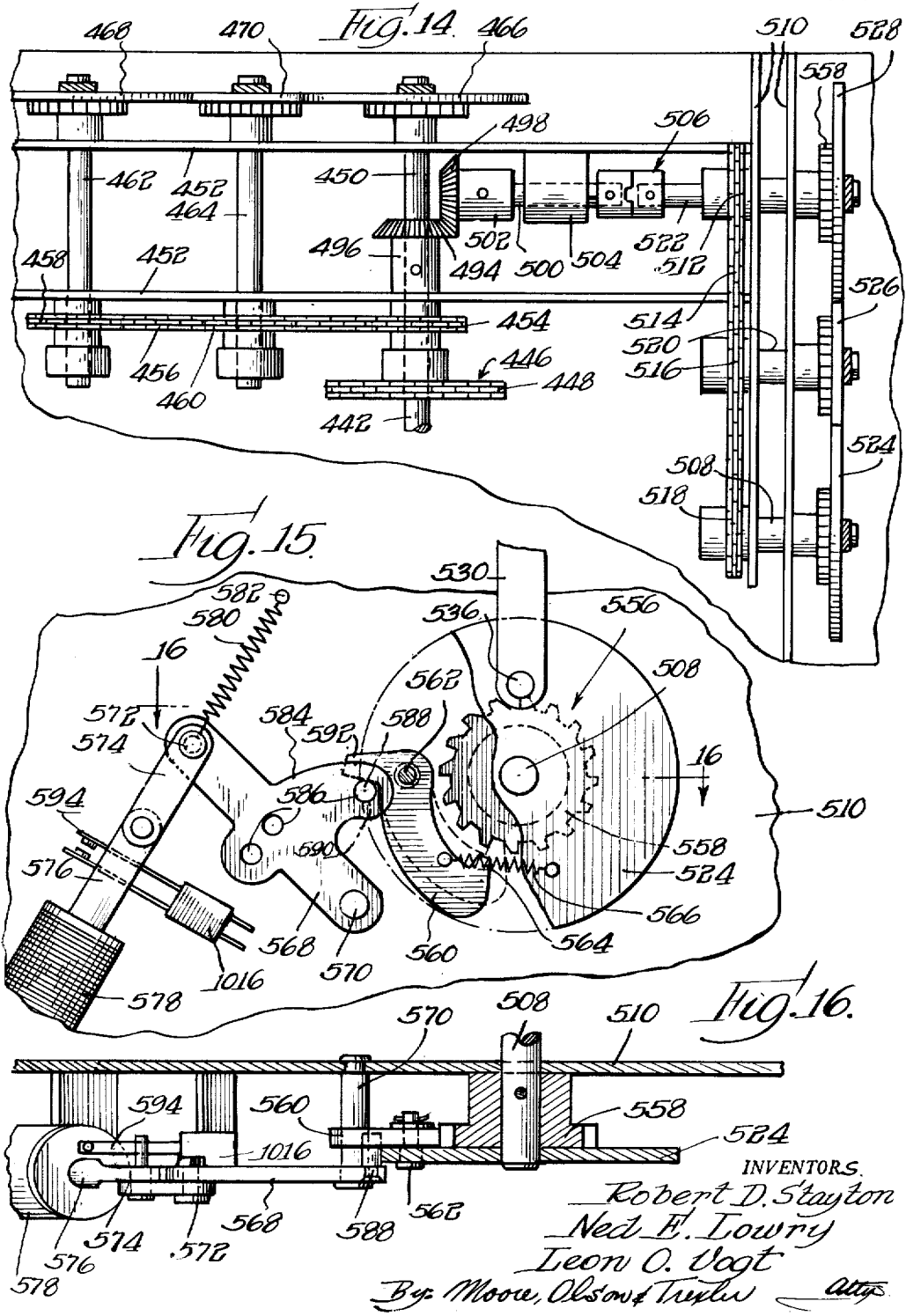

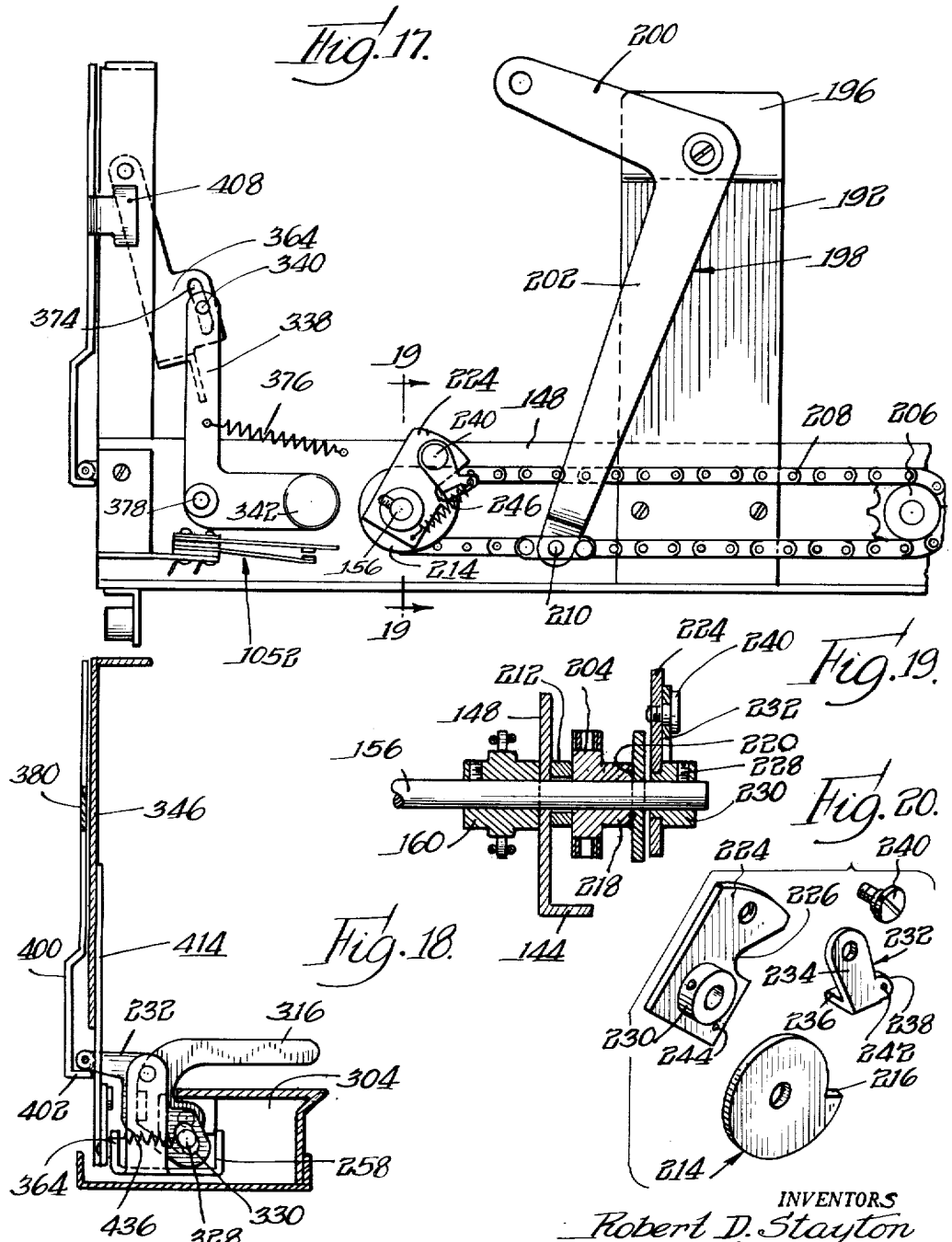

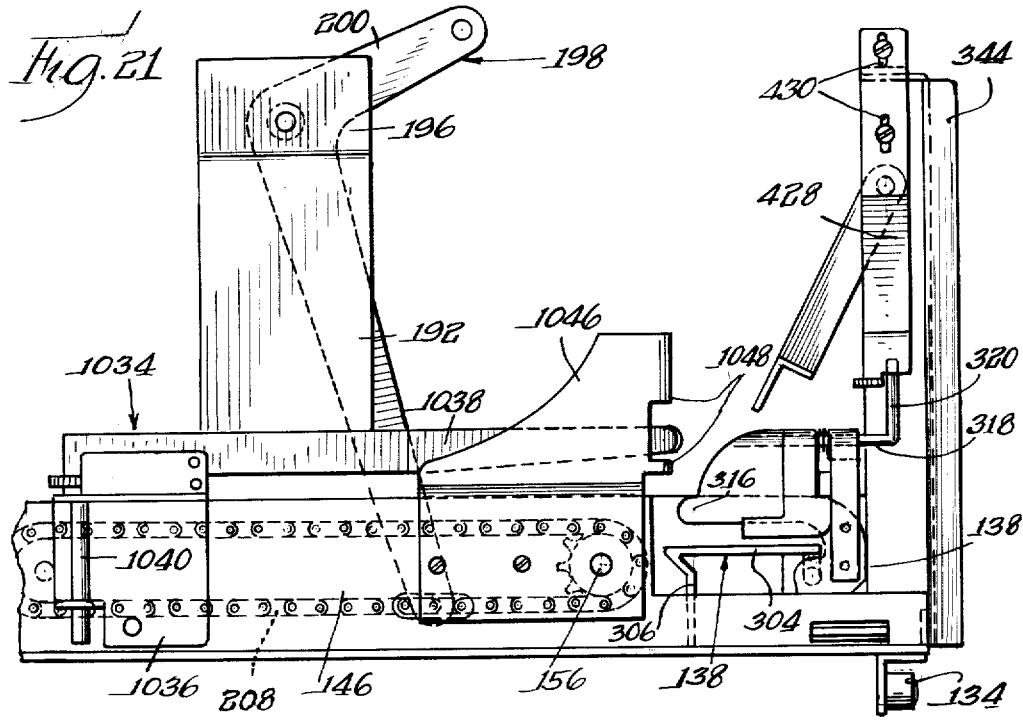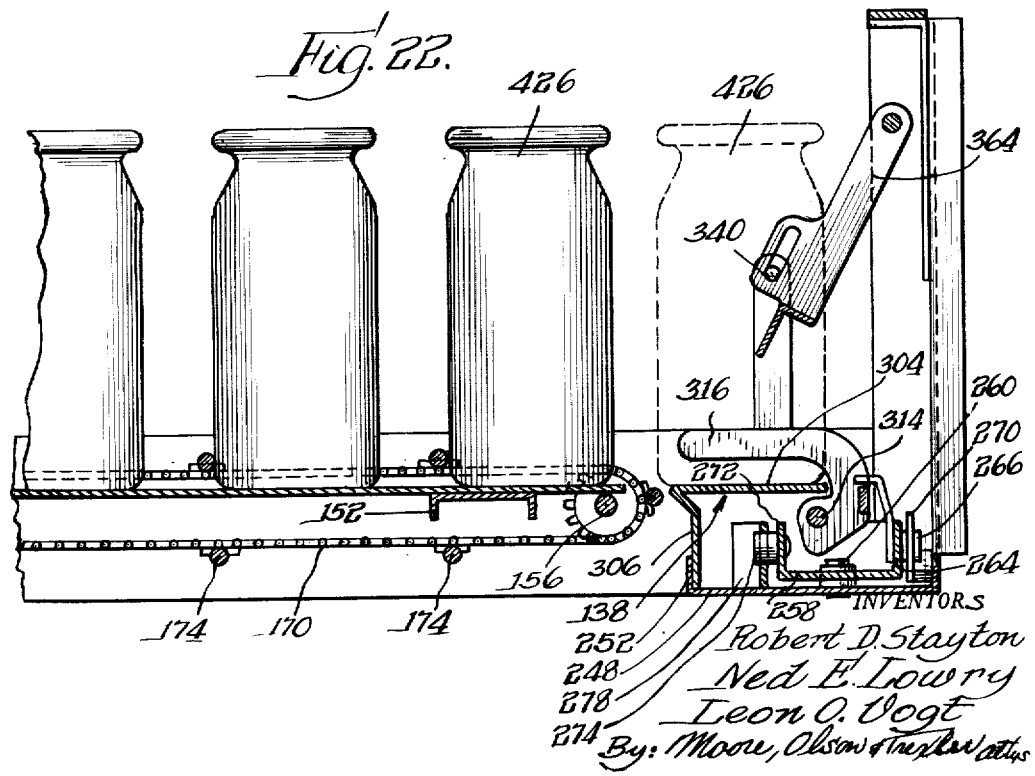

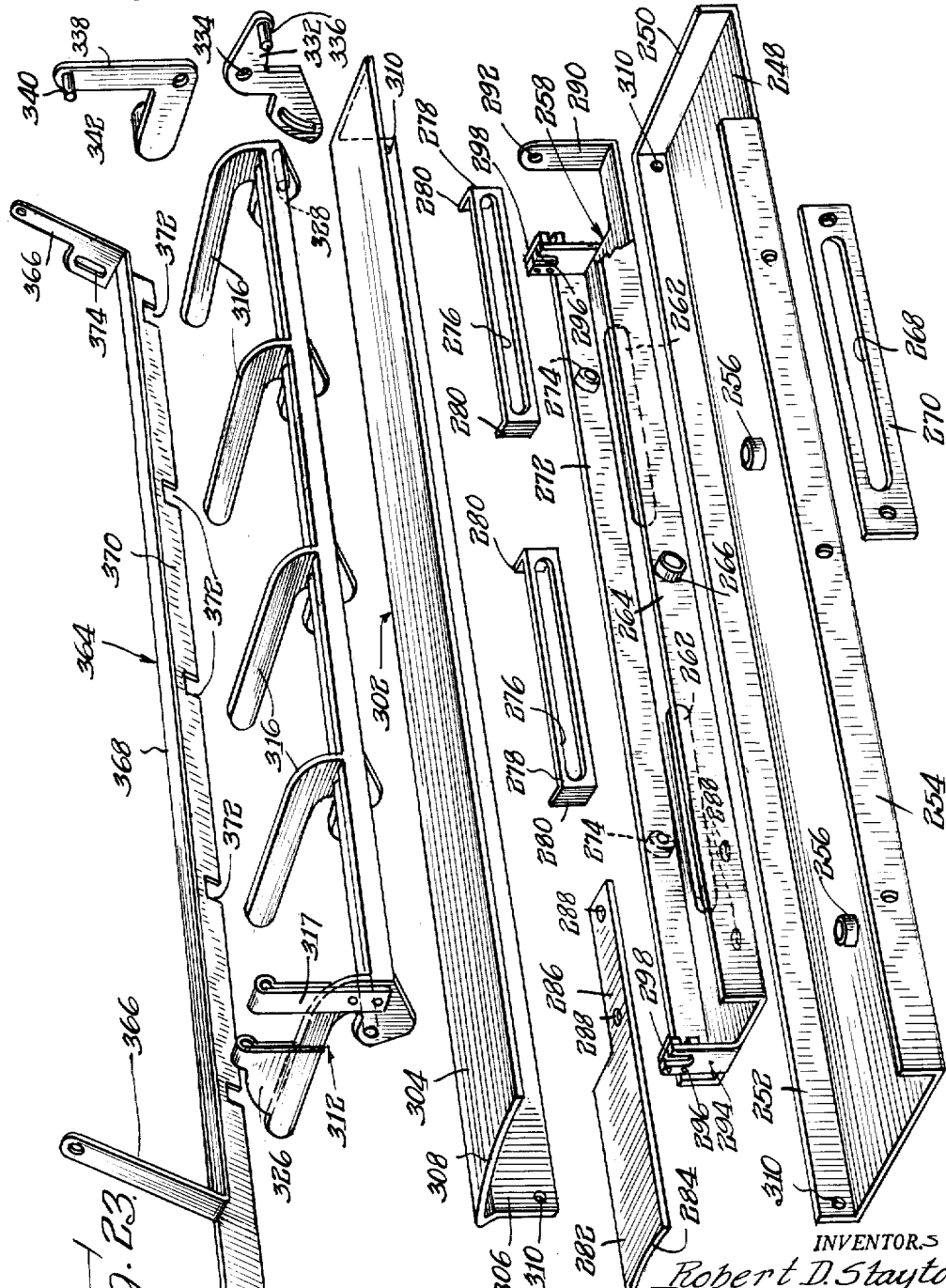

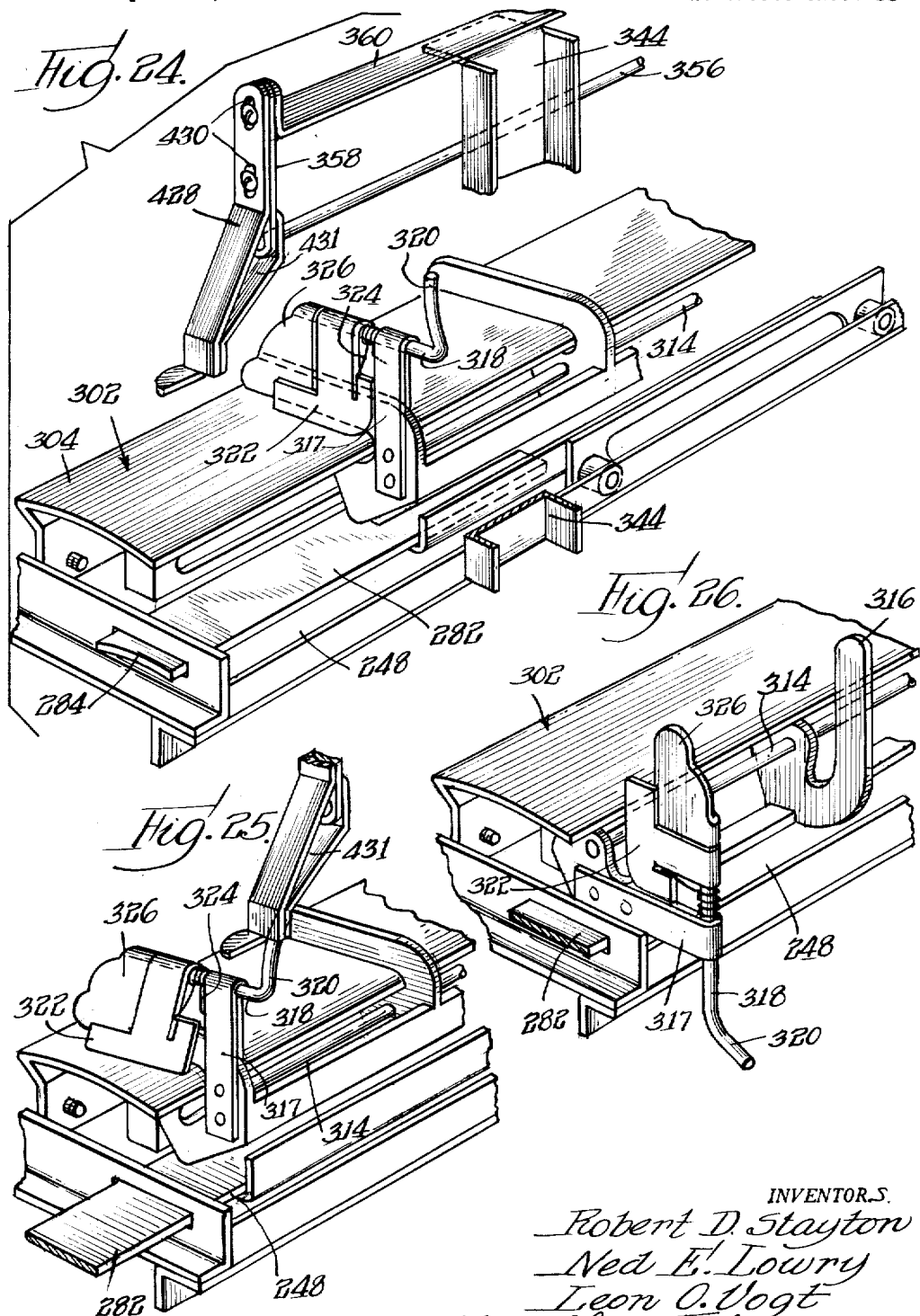

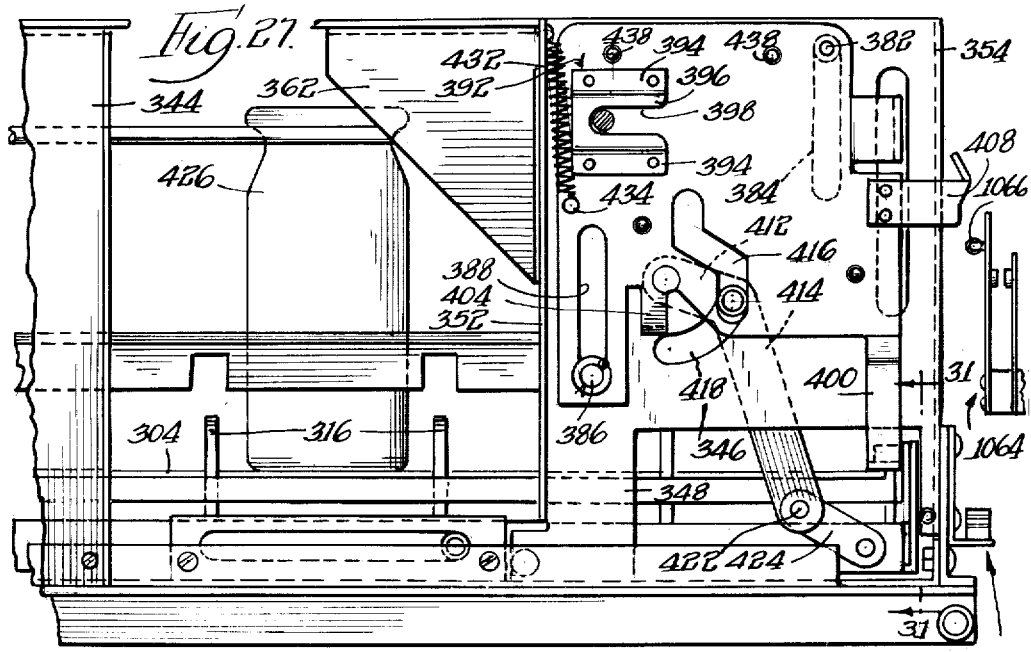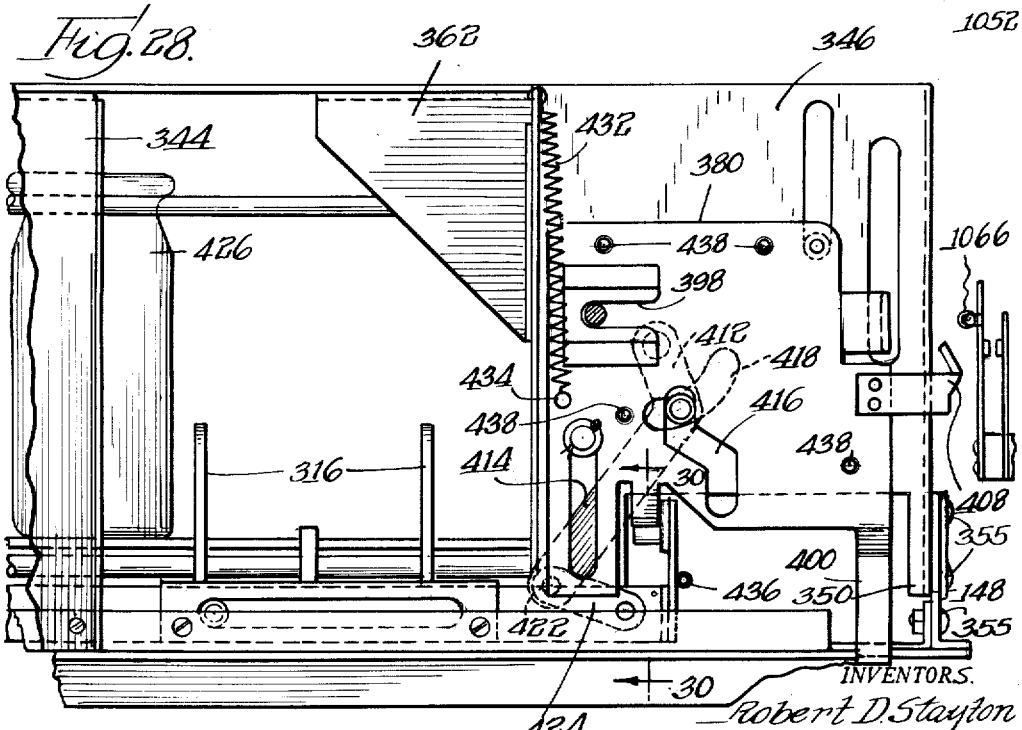

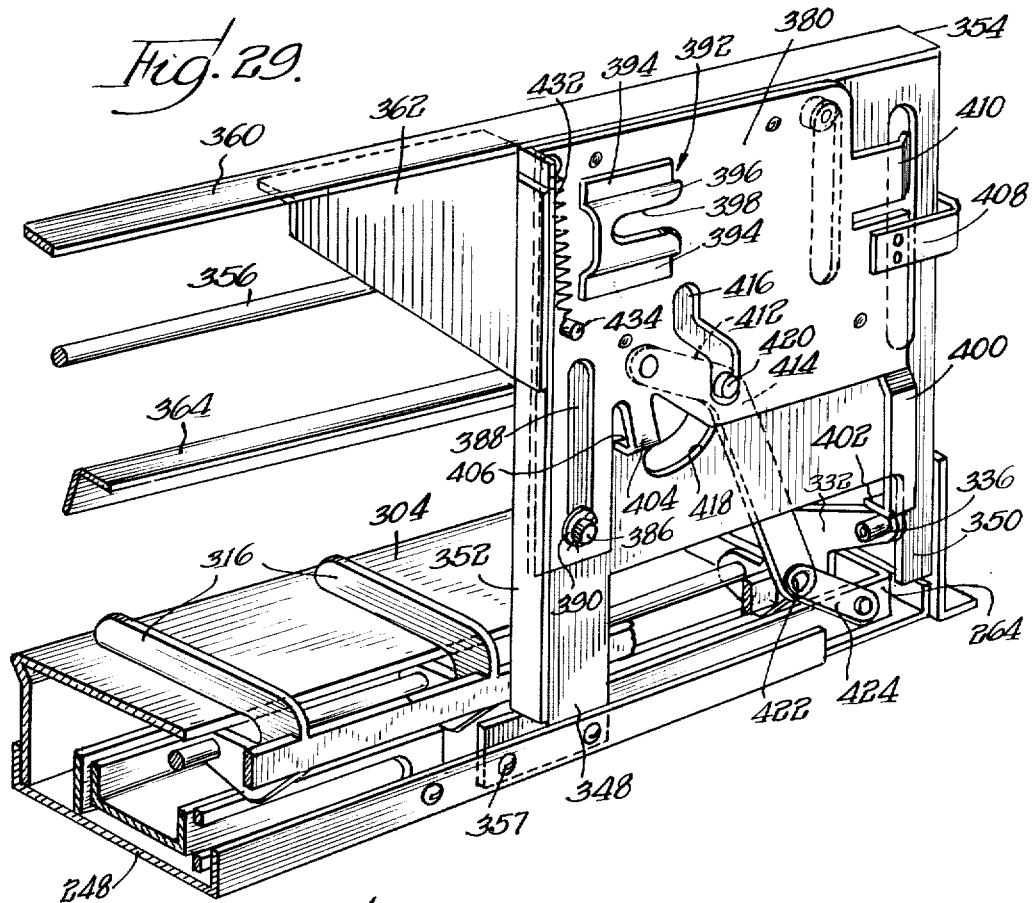
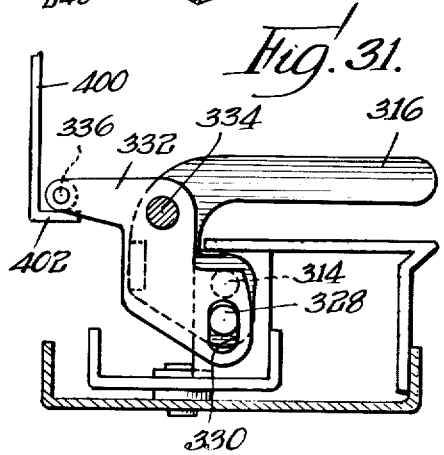
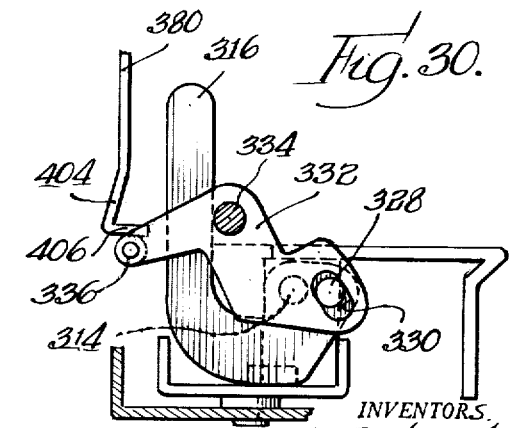

April 4, 1961   R. D. STAYTON ET AL   2,978,085
VENDING MACHINE
Filed April 24, 1951   20 Sheets-Sheet 14
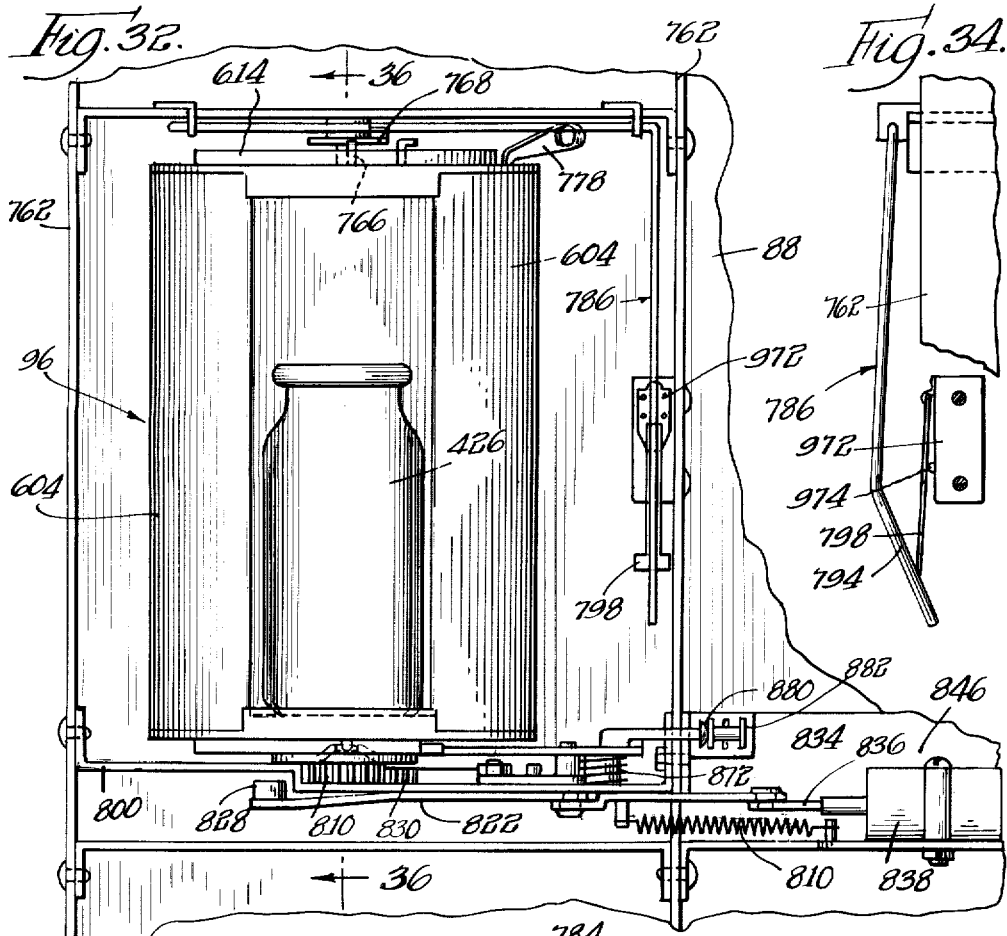
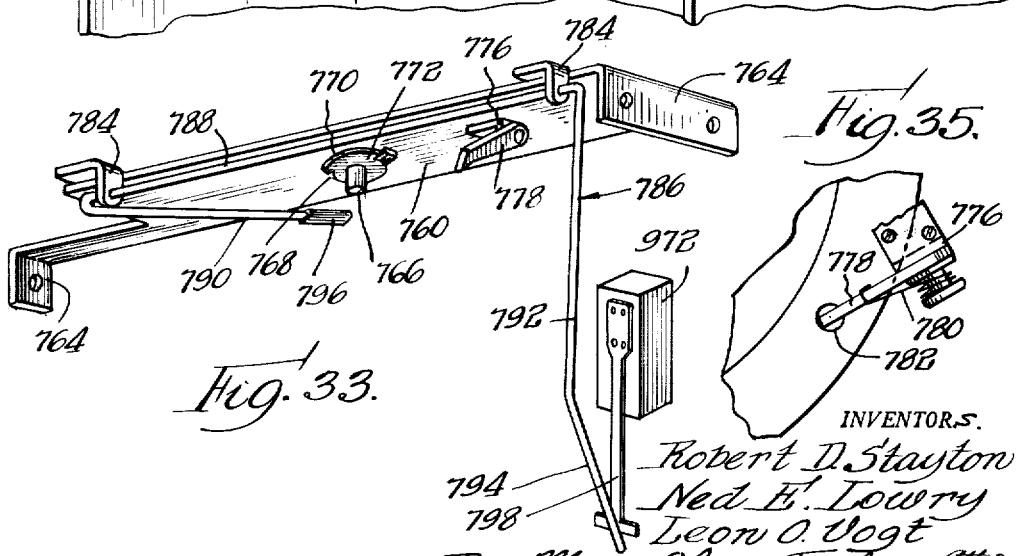
INVENTORS.
Robert D. Stayton
Ned H. Lowry
Leon O. Vogt
By: Moore, Olson & Trexler  attys.

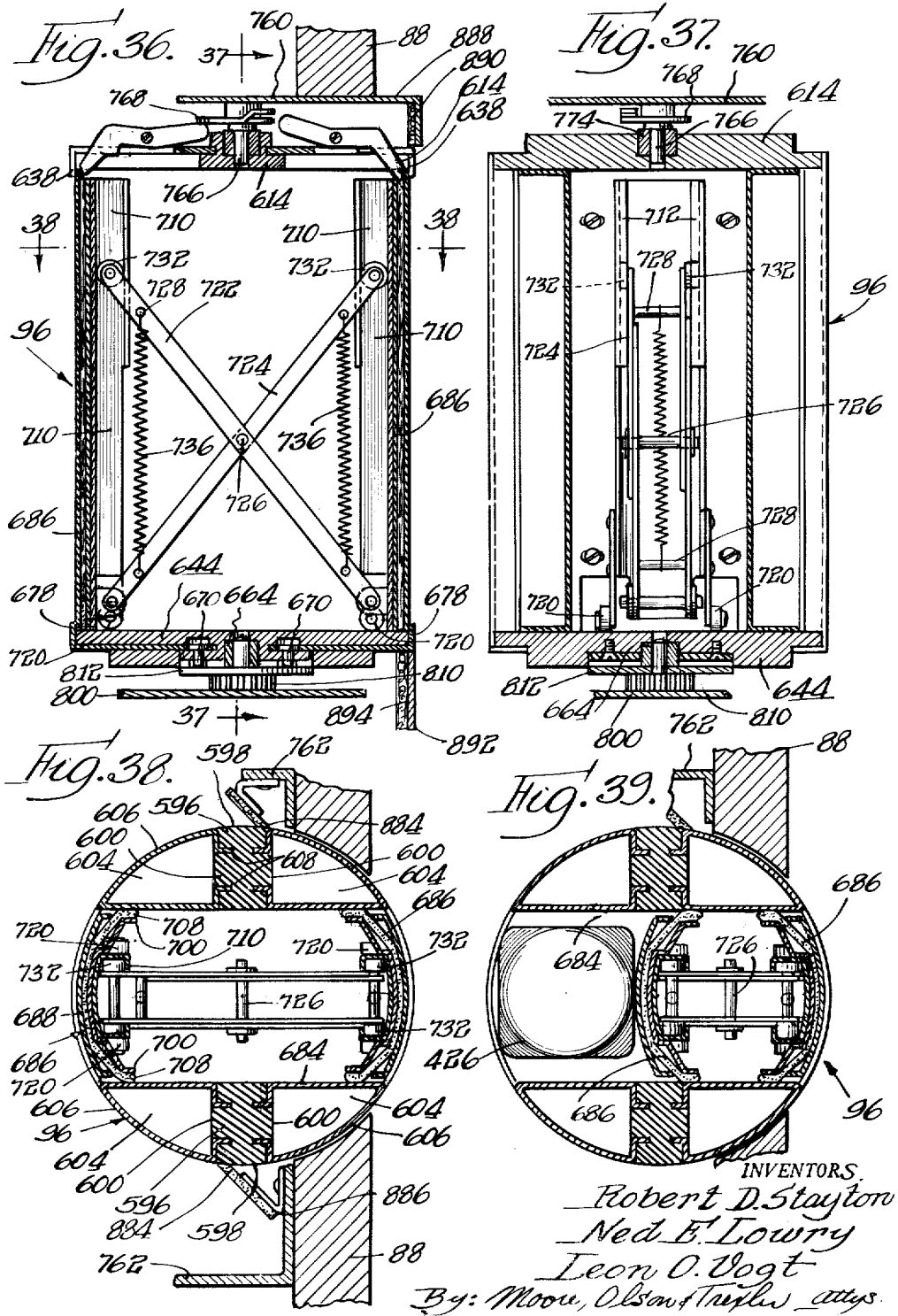

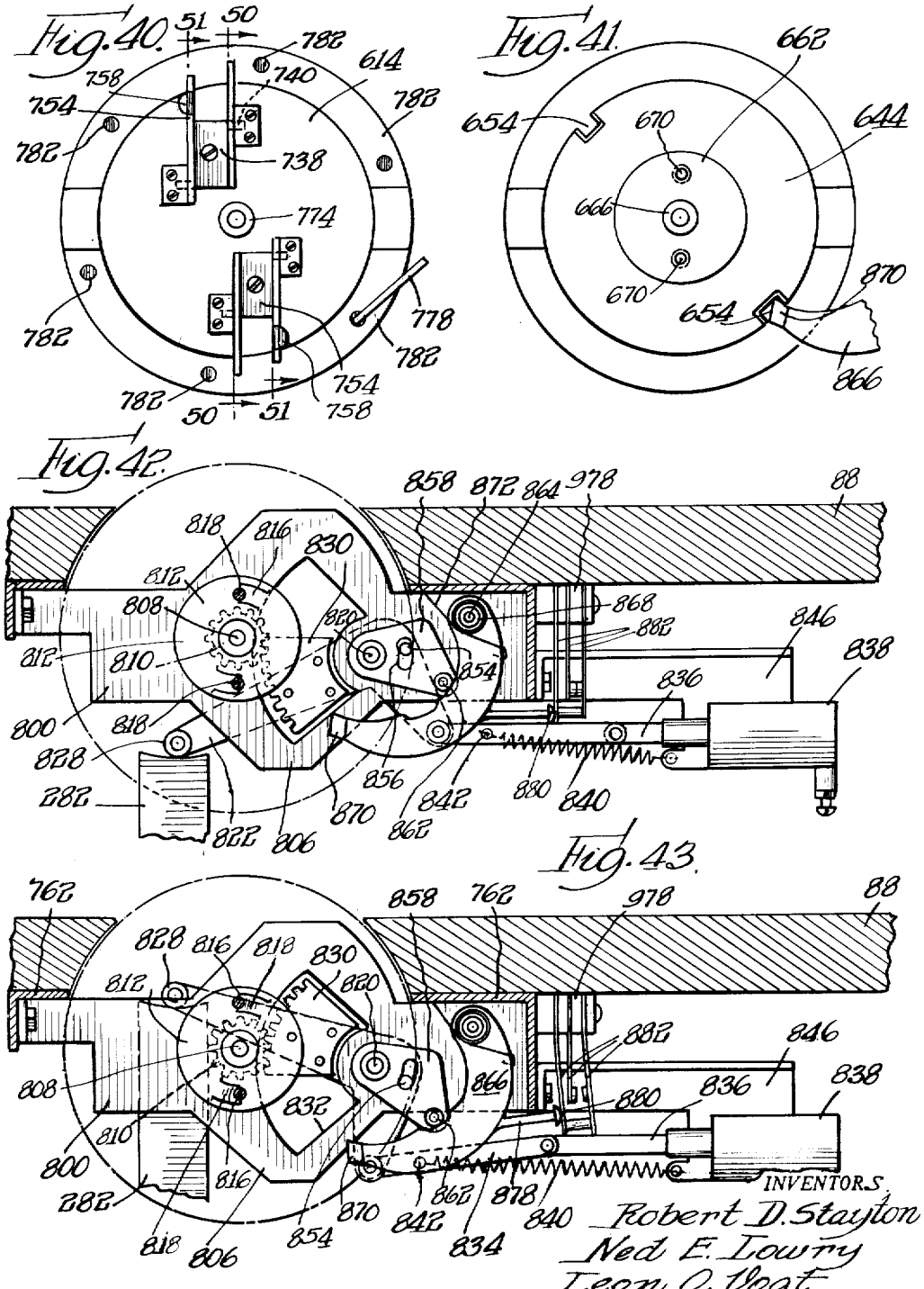

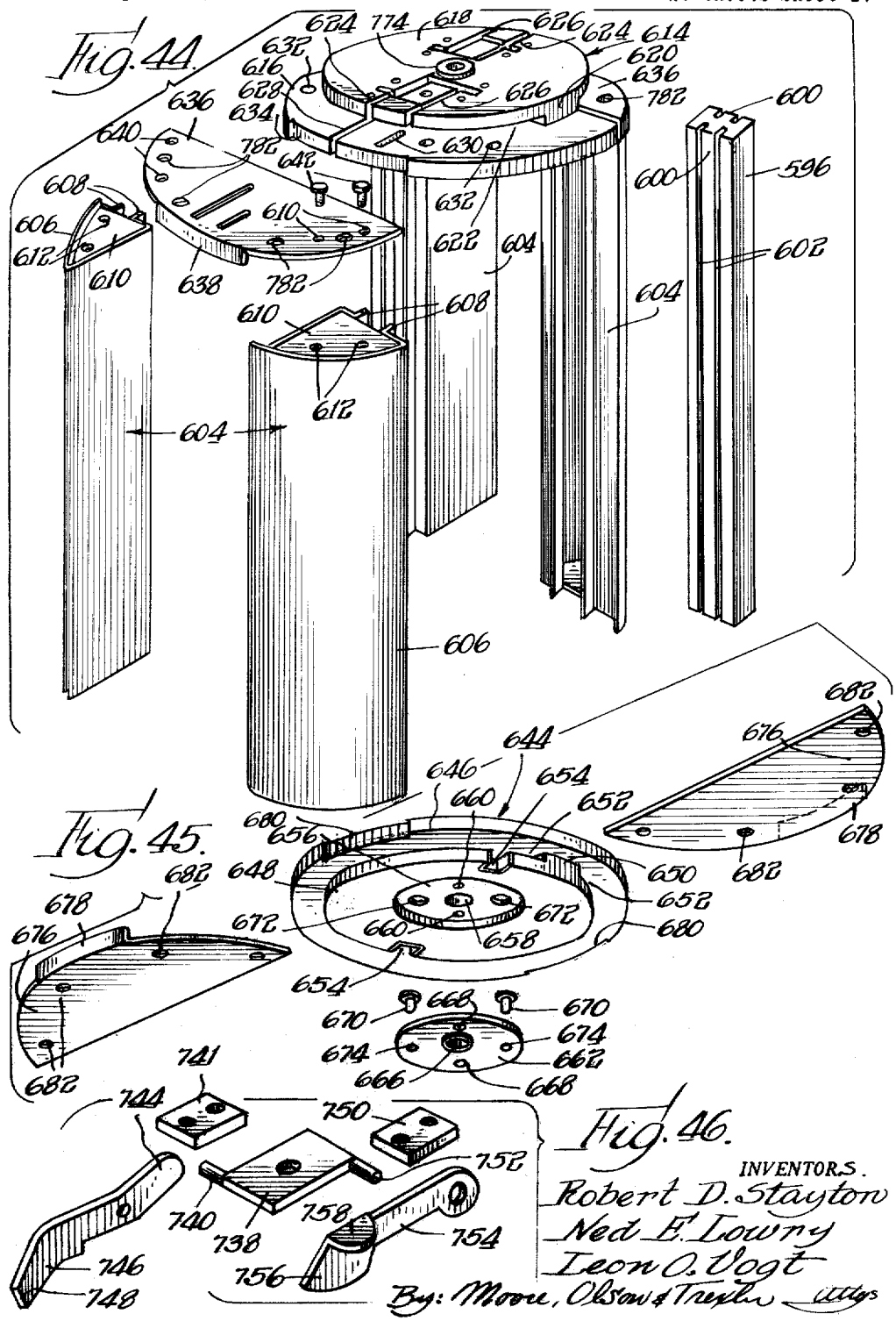

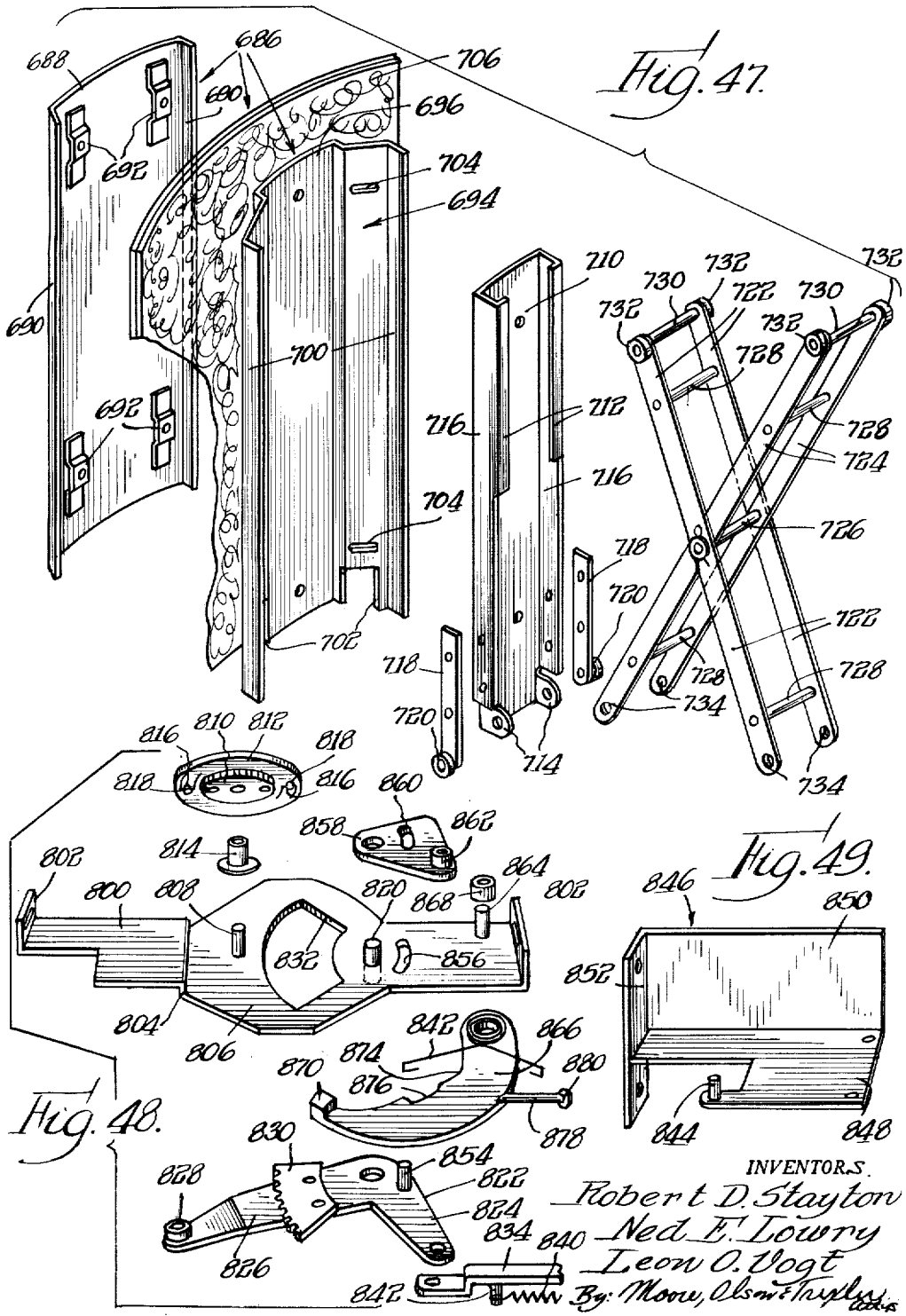

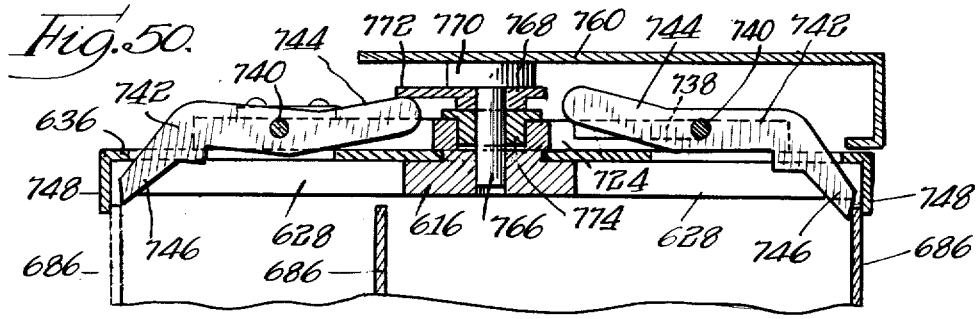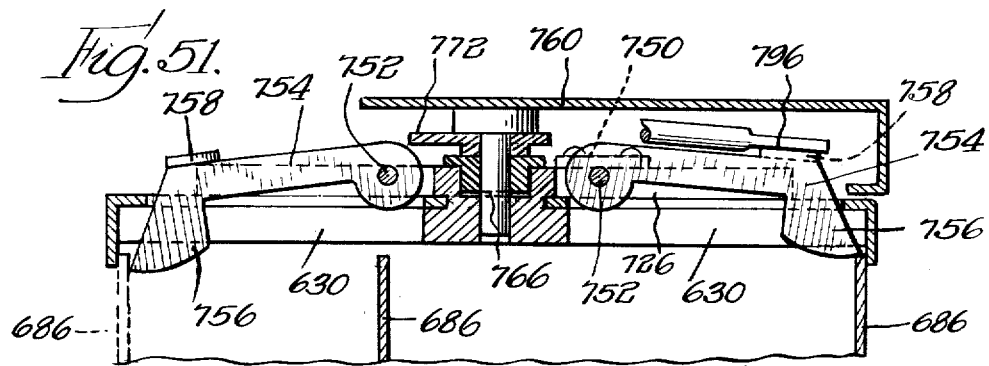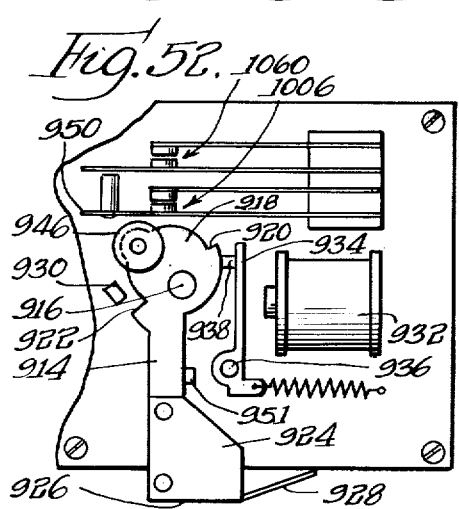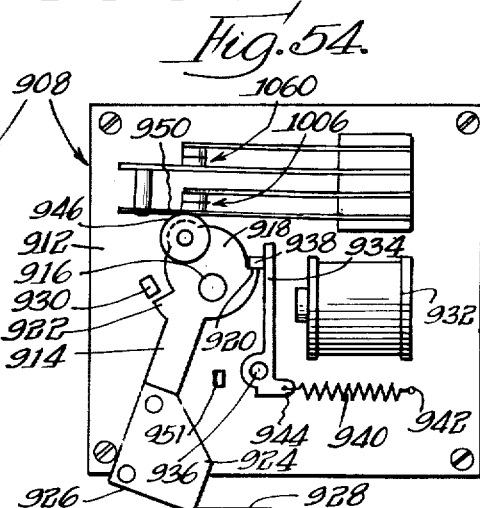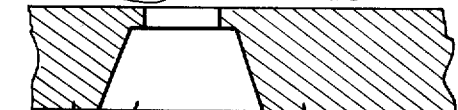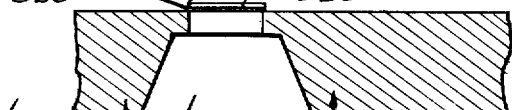

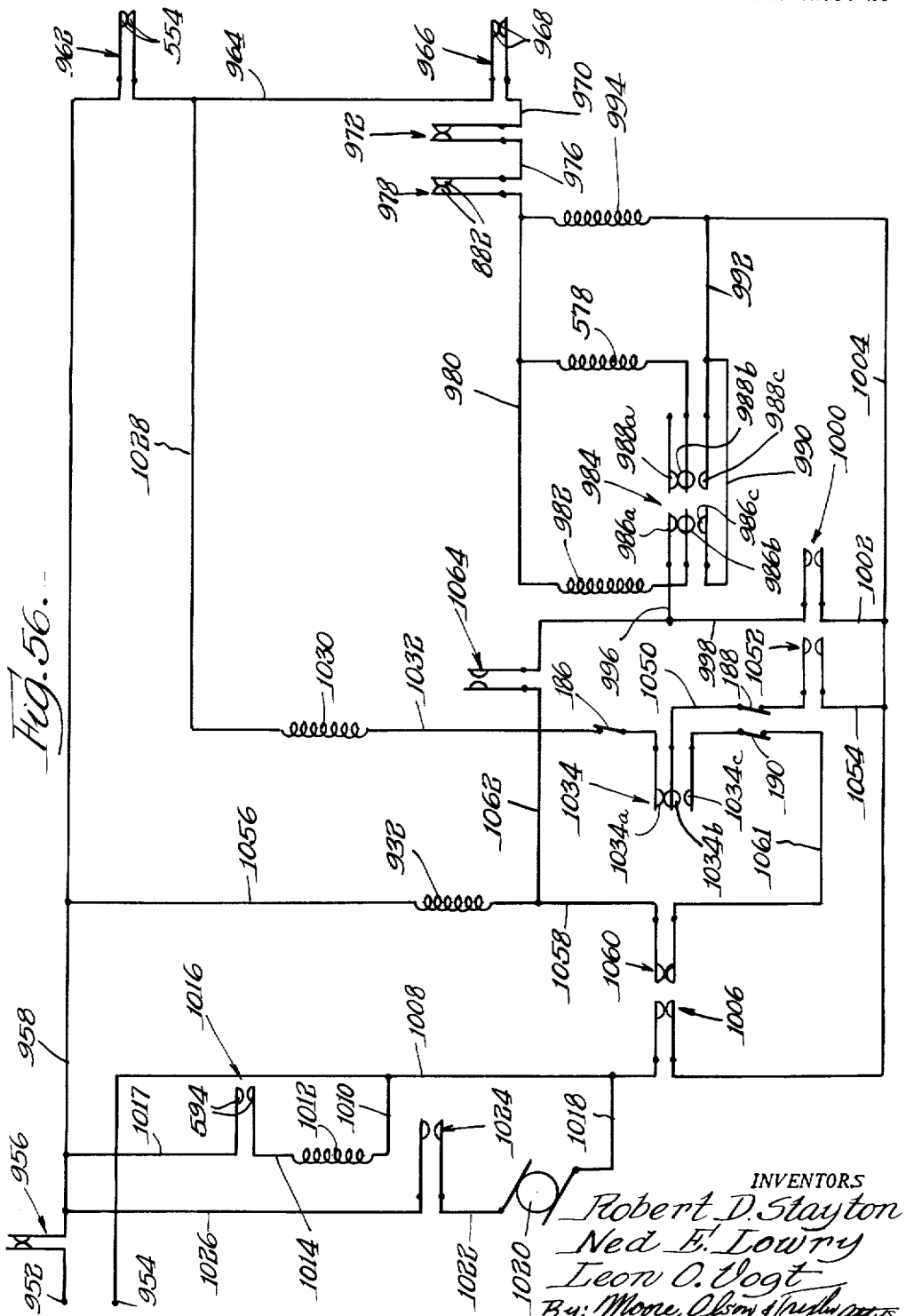

United States Patent Office 2,978,085
Patented Apr. 4, 1961

2,978,085

VENDING MACHINE

Robert D. Stayton, 321 S. Lincoln, and Ned E. Lowry, 1018 Galena Ave., both of Aurora, Ill., and Leon O. Vogt, Garfield Ave., Oswego, Ill.

Filed Apr. 24, 1951, Ser. No. 222,641

14 Claims. (Cl. 194—10)

This invention relates to vending machines and is concerned particularly with coin controlled electrically operated machines for vending bottles of milk or other relatively compact articles.

The vending machine disclosed herein is particularly adapted to the vending of milk and solves many of the problems inherent in such vending. The apparatus has application for vending other articles but for the sake of illustration and example, the machine will be spoken of herein primarily as used in vending bottles of milk.

Demand for milk reaches rather heavy peaks at meal times and continues to some degree at practically all times. Thus a vending machine for delivering bottles of milk must be capable of storing a large number of bottles at one time and must be capable of delivering a great number of bottles in a very short time. The milk must be maintained at relatively low temperatures and hence the apparatus disclosed herein is refrigerated. In all vending machines, cleanliness is an important factor, and in machines for vending milk it is of utmost importance for the psychological factor involved is nearly as important as is the physical factor. People will refuse to buy milk when there is any hint whatsoever of uncleanliness whereas they will not be so fastidious with regard to other articles. Accordingly, the vending machine presented herein is completely enclosed with the exception of delivery openings. The machine thus not only remains clean internally but presents an outward appearance of cleanliness and sanitation.

Even under refrigerated conditions, milk cannot be stored indefinitely. Therefore our machine has been constructed to deliver bottles of milk in the order in which they have been placed in the machine so that no bottles remain in the machine for an excessive period of time. The storage and delivery magazines of the machine are readily accessible for filling by a service man and positive interlocking controls are provided to prevent jamming of the machine in case of improper filling.

The general object of this invention is the provision of an improved coin controlled vending machine for dispensing bottles of milk or other compact articles.

An important object of this invention is the provision of a delivery tray from whence bottles of milk or other articles are shifted one by one by a set of reciprocating and oscillating fingers to a delivery station and a storage tray wherein a large number of rows of bottles are stored, these latter bottles being shifted row by row on to the delivery tray as the delivery tray is exhausted.

A further object of this invention is the provision in a vending machine of a plurality of sets of delivery and storage trays as set forth in the foregoing object wherein each set is individually operable and two or more sets may operate concurrently in any haphazard time relationship to provide quick delivery, greater capacity, and a selection of articles.

A further object of this invention is the provision in a vending machine of a delivery tray and storage tray as heretofore set forth wherein a single motor operates apparatus to discharge bottles or other articles from the delivery tray and also operates apparatus intermittently to advance rows of bottles or other articles from the storage tray on to the delivery tray.

A further object of this invention resides in the provision in a vending machine having delivery and storage trays and a single motor for operating bottle advancing means on both of said trays, of electro mechanically operable clutches for selectively clutching said motor to advancing means associated with the delivery tray to deliver a bottle from this tray, or to advancing means associated with the storage tray for delivering a row of bottles from the storage tray to the delivery tray.

Yet another object of this invention resides in the provision of a vending machine having a plurality of similar sets of delivery and storage trays wherein a single motor is coupled selectively to one or more of said sets to effect the advance of bottles thereon.

Another important object of this invention resides in the provision of a vending machine having storage and delivery trays wherein said trays are mounted for sliding movement part way out of the cabinet of the machine to facilitate loading of the machine or all of the way out of the machine for cleaning, repair, or replacement.

Yet another object of this invention is the provision of a vending machine wherein article supporting and advancing trays or magazines are slidable part way or entirely from the cabinet to facilitate loading, cleaning, repair, or replacement thereof and such partial movement of a tray or magazine automatically disengages the driving connections for article advancing means associated with the tray or magazine.

A further object of this invention resides in the provision of an improved delivery mechanism for shifting bottles or other articles from the interior to the exterior of a vending machine cabinet wherein the delivery mechanism precludes the entrance of a hand or other foreign body into the machine in an attempt to secure a bottle or other article which has not been paid for.

Other and further objects and advantages will be apparent from the following description when taken in connection with the accompanying drawings illustrating a preferred form of the invention wherein:

Fig. 3 is a vertical sectional view taken substantially along the line 3—3 of Fig. 2;

Fig. 4 is a vertical sectional view taken substantially along the line 4—4 of Fig. 3;

Fig. 5 is a perspective view of one of the storage shelves or trays with the bottle advancing means and the delivery tray or shelf removed;

Fig. 6 is a fragmentary detail view showing the mounting of a drive sprocket on the tray or shelf of Fig. 5;

Fig. 7 is a fragmentary perspective view showing the electrical control connections between the shelf of Fig. 5 and the cabinet in which the shelf is mounted;

Fig. 8 is an enlarged fragmentary plan view of a portion of the shelf shown in Fig. 2;

Fig. 9 is a fragmentary vertical view taken substantially along the line 9—9 of Fig. 8 showing the driving connections to the advancing means of the storage shelves;

Fig. 10 is a fragmentary perspective view showing the interconnection between a connecting rod and an actuating lever for the article advancing means of a storage shelf;

Fig. 11 is a perspective view showing the detachable driving connections to actuate the delivery mechanism;

Fig. 12 is a perspective view showing a switch and actuator therefor on one of the connecting rods of the delivery mechanism;

Fig. 13 is a fragmentary vertical section taken substantially along the line 13—13 of Fig. 8;

Fig. 14 is a fragmentary horizontal section taken substantially along the line 14—14 of Fig. 9 showing the drive connections from the single motor to the actuating mechanisms of the various article advancing means;

Fig. 15 is an enlarged detail view showing one of the clutch mechanisms of Fig. 13;

Fig. 16 is a sectional view taken substantially along the line 16—16 of Fig. 15;

Fig. 17 is a detail view illustrating the advancing mechanism associated with one of the storage shelves and illustrating also the bottle detector of the associated delivery shelf;

Fig. 18 is a partial view partly in vertical section of the delivery conveyor seen when looking toward the dispensing outlet;

Fig. 19 is a sectional view taken along the line 19—19 of Fig. 17;

Fig. 20 is an exploded perspective view showing some of the parts of Fig. 19;

Fig. 21 is a fragmentary view showing the relative positioning of a storage and delivery shelf and taken substantially along the line 21—21 of Fig. 8;

Fig. 22 is a view similar to Fig. 21 and displaced slightly therefrom to show certain of the parts in section;

Fig. 23 is an exploded perspective view of the delivery shelf and the fingers for advancing bottles or other articles therealong;

Fig. 24 is a fragmentary perspective view of the delivery shelf showing certain of the structure cooperative therewith;

Fig. 25 is a view similar to Fig. 24 showing the parts in a different position;

Fig. 26 is a view similar to Figs. 24 and 25 showing the parts in yet another position;

Fig. 27 is an enlarged view of a portion of a delivery shelf actuating mechanism similar to a portion of Fig. 13 and taken substantially along the line 27—27 of Fig. 8;

Fig. 28 is a view similar to Fig. 27 showing the parts in a different position;

Fig. 29 is a perspective view substantially similar to Figs. 27 and 28;

Fig. 30 is a sectional view taken substantially along the line 30—30 of Fig. 28;

Fig. 31 is a view substantially similar to Fig. 30 showing the parts in a different position and taken along the line 31—31 of Fig. 27;

Fig. 32 is a fragmentary elevational view of one of the delivery drums or cylinders looking from the inside of the storage cabinet.

Fig. 33 is a perspective view showing part of the mounting and control mechanism of the drum with the drum removed;

Fig. 34 is a side view showing part of the mechanism of Fig. 33;

Fig. 35 is a fragmentary top view of a portion of the drum and the pawl operable therewith to prevent reverse rotation;

Fig. 36 is a longitudinal sectional view of the drum as taken substantially along the line 36—36 of Fig. 32;

Fig. 37 is a longitudinal sectional view of the drum taken along the line 37—37 of Fig. 36;

Fig. 38 is a horizontal sectional view of the drum taken substantially along the line 38—38 of Fig. 36;

Fig. 39 is a view similar to Fig. 38 showing the parts in a changed position with a bottle in place in the drum;

Fig. 40 is a top view of the drum;

Fig. 41 is a bottom view of the drum;

Fig. 42 is a top view of the actuating mechanism of the drum, the drum being shown in dashed lines;

Fig. 43 is a view similar to Fig. 42 showing the parts in a different position;

Fig. 44 is an exploded perspective view of certain parts of the delivery drum;

Fig. 45 is an exploded perspective view showing the parts forming the bottom of the drum;

Fig. 46 is an exploded perspective view of certain operating parts of the drum;

Fig. 47 is an exploded perspective view of certain of the remaining parts of the drum;

Fig. 48 is an exploded perspective view showing part of the driving mechanism of the drum;

Fig. 49 is a perspective view of a mounting bracket for part of the delivery drum actuating mechanism;

Fig. 50 is an enlarged fragmental, sectional, elevational detail view of the top part of the drum taken along the line 50—50 of Fig. 40;

Fig. 51 is an enlarged detail sectional view taken substantially along the line 51—51 of Fig. 40;

Fig. 52 is a view from the interior of the vending machine cabinet showing certain of the electrical controls when one of the vending levels is empty;

Fig. 53 is a view taken along the line 53—53 of Fig. 52;

Fig. 54 is a view similar to Fig. 52 showing the parts when the vending level is full;

Fig. 55 is a view taken along the line 55—55 of Fig. 54; and

Fig. 56 is an electrical circuit diagram for the vending machine.

Figure 1:
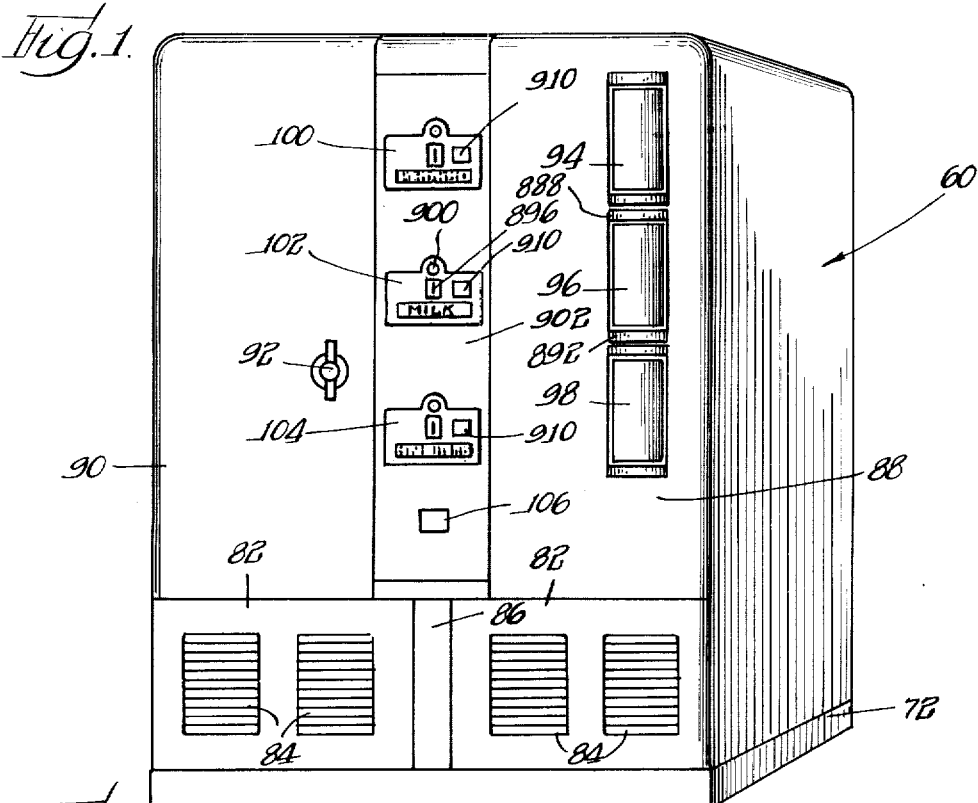
Fig. 1 is a perspective view of a vending machine embodying the principles of our invention.

Referring first to Figs. 1–4, a vending machine incorporating the principles of our invention may be seen to comprise an insulated cabinet 60 having insulated side walls 62 and 64, a rear insulated wall 66, an insulated roof 68 and an insulated floor 70. The floor 70 rests on a base having lower substantially channel shaped peripheral members 72 adapted to rest upon a floor or other supporting surface. The members 72 may carry casters or other supporting structure therebelow to facilitate movement of the cabinet. Vertical angle members 74 extend upwardly from the peripheral members 72 and are topped by a rectangular framework of angle members 76. The insulated floor 70 rests on the angle members 76 and is secured thereto in any suitable manner. An outer casing of sheet metal 78 overlies the top and insulated side walls of the cabinet and extends downward over most of the base to provide an attractive outward appearance. A section of sheet metal 80 similarly covers the rear face of the vending cabinet. The front of the base is completed by doors 82 provided with ventilating louvers 84 hinged at the outer vertical edges and abutting a central vertical support 86. The front of the vending machine is completed by one or more insulated doors, herein shown as two such doors 88 and 90. The doors are secured in closed position by any suitable latch mechanism controlled by a handle 92 carried by the door 90 and capable of being locked with a key. The door 88 carries delivery drums or cylinders 94, 96 and 98 later to be described in considerable detail. Coin receptacles 100 and 102 and 104 are provided, one for each of the drums 94–98. Each of the coin receptacles includes a coin slot, a coin return button, and a label denoting the article to be vended in response to the insertion of a coin in the accompanying coin slot, such articles being illustrated herein as bottles of milk which may be plain milk or chocolate flavored milk drink. A single coin return 106 is provided to return coins from any of the coin receptacles. The door 88 is hinged by any suitable hinge mechanism to the side wall 64 at 108 while the door 90 is similarly hinged to the side wall 62 at 110. A gasket 111 of rubber or the like encircles the door to prevent leakage of air between the door and the remainder of the cabinet and is compressed between wooden breaker strips 109.

A compressor unit 112 of any suitable design and shown simply in block outline is carried within the base of the cabinet adjacent certain of the louvers 84. Cooling coils in a chamber 114 are located directly above the insulated floor 70 and receive compressed refrigerant from the compression unit 112 to cool the inside of the insulated compartment. An upwardly directed vent 116 is mounted on the front of the chamber 114 containing the cooling coils and a conduit 118 carried by the door 90 is aligned with this vent when the door 90 is in closed position. A fan preferably is provided to direct air out the vent and upwardly through the conduit as indicated by the arrows to cool the entire interior of the insulated cabinet. When the door 90 is swung to open position, the conduit 118 is carried away from the cabinet so that the interior thereof is open to a service man.

Three pairs of tracks 120, 122 and 124 are mounted on a frame 126 of the cabinet within the refrigerated compartment of the cabinet 60, extending from the front to near the rear of the interior of the cabinet. Each pair of tracks 120, 122 and 124 carries respectively a tray 128, 130 and 132 suitably supported by rollers 134 (see also Fig. 5).

*The storage shelf*

Each tray, of which the tray 130 has been shown as an enlarged illustrative example in Figs. 5 and 8, includes a storage shelf generally designated 136 and adapted to store a reserve of bottles to be shifted on to a delivery shelf 138 as will appear hereinafter. Each tray has a frame consisting of forwardly and rearwardly extending angle members 140, hereinafter referred to as longitudinal frame or angle members, and a front transverse angle member 142 and a rear transverse angle member 144. Both of these members have relatively high upstanding flanges 146 and 148 respectively, the frame being relieved at one end as at 150 for a purpose to be disclosed hereinafter. Three spaced longitudinal channel members 152 are secured between the upstanding flanges 146 and 148 by any desirable means such as welding and these channel members support a plurality of transversely arranged shallow trays 154. In the embodiment illustrated there are five such shallow trays each having upwardly directed longitudinal flanges 155 along its edges and longitudinal ribs along its upper surface. These trays go to make up the storage shelf 136. A drive shaft 156 is journalled in the upstanding flanges 146 and 148 of the transverse angle members adjacent one end of the storage shelf 136. This end will be referred to hereinafter as the discharge end 158 and is terminated just slightly past the vertical limit of the relieved portion 150 of the front transverse angle member. The drive shaft has drive sprockets 160 suitably affixed to it with their hubs against the inner faces of the flanges 146 and 148. The means by which this drive shaft is driven will be disclosed hereinafter.

At the opposite ends of the flanges 146 and 148, the flanges are provided with two small horizontal slots 162 displaced transversely and a larger horizontal slot 164 located midway between them. Mounting plates 165 are secured to the outer faces of the flanges 146 and 148 by means such as bolts extending either through the smaller horizontal slots 162 and threaded into the plates 165 or by nuts and bolts which obviate the necessity of threading apertures in the plate 165. Stub shafts 166 extend inwardly through the larger horizontal slots 164 and idler sprockets 168 are mounted for rotation on the stub shafts 166. The idler sprockets are spaced a suitable distance inwardly from the flanges 146 and 148 by hubs on the sprockets. A pair of endless chains 170 are passed over the drive sprockets 160 and idler sprockets 168 and are maintained taut by shifting the plates 165 and tightening the bolts securing these plates. The upper reach 172 extends above the storage shelf 136 while the lower reach passes therebelow. The endless chains 170 carry a plurality of longitudinal rods 174 (these rods being transversely arranged relatively to the chains). The rods are spaced apart a distance substantially equal to or just slightly greater than the spacing between the flanges of the shallow trays 154 of the storage shelf 136. The rods are circular in cross section except at their ends where they are flattened as at 176. The flattened portions 176 of the rods are secured to the chains on the outside perimeters thereof by any suitable means such as welding or bolts passed through links of the chains and threaded into the flattened portions 176.

The rods 174 and trays 154, being transversely arranged relative to one another, give the storage shelf a checker-board appearance with nine longitudinal columns 178 and five transverse rows 180 of squares. Each of the squares is of sufficient size to accommodate a bottle of milk, for example a one-half pint or a one-third quart.

The shallow trays 154 making up the storage shelves are spaced apart to allow proper air circulation to cool the bottles and to maintain proper transverse spacing of the bottles. The upwardly directed longitudinal flanges 155 keep the bottles in line and support the pusher rods 174.

Each of the trays 128, 130 and 132 is adapted to be shifted forward on its respective tracks 120, 122 and 124 to facilitate stocking of the vending machine with bottles of milk or other articles. To allow a tray to be slid forward for refilling or to be removed for cleaning without having any long or dangling wires or wires which would have to be disconnected. I have provided an interlock consisting of cooperating electrical contacts openable upon sliding forward of any of the trays. As shown in Figs. 5–7, an upstanding panel 182 of insulating material is secured to the flange 148 adjacent the plate 165 by any suitable means such as screws or rivets. A cooperating panel 184 of insulating material is secured to a transverse member of the frame 126 by any suitable means. The panel 182 and 184 carry cooperating electrical switch contacts 186a, 188a, 190a and 186b, 188b, and 190b. When a shelf is in operating position, these contacts are closed and when a shelf is withdrawn the contacts are opened.

Each shelf further carries an upstanding bracket 192 (Figs. 5, 8, 9, 17 and 21) having a horizontal offset portion 194 and an upwardly extending flange 196. A bell crank lever 198 is pivoted on a pin carried by the vertical flange 196 at the top of the bracket 192 and has a short arm 200 and a long arm 202.

A drive sprocket 204 is carried on the rear end of the drive shaft 156 and is cooperatively connected thereto by a pawl and ratchet mechanism shortly to be discussed. An idler sprocket 206 is spaced therefrom a suitable distance which is somewhat greater than the spacing between a pair of the rods 174. An endless chain 208 is passed over these sprockets and the lower end of the long arm 202 of the bell crank lever 198 is pivotally connected to the lower reach of this chain at 210.

The pawl and ratchet connection by means of which the chain 208 drives the drive shaft 156 best may be seen in Figs. 17, 19 and 20 is shown also in Fig. 8. The sprocket wheel 204 is mounted loosely on the drive shaft 156 near the end thereof. A sleeve or collar 212 spaces the sprocket 204 from the flange 148 of the transverse angle member 144. A sheet metal cam 214 has an outer periphery substantially in the form of a spiral providing a driving surface 216. The cam 214 is welded to a hub 218 on the sprocket 204 as at 220. A lever 224 having a relieved portion 226 is fixed to the shaft 156 by means of a set screw 228 passing through a hub 230 on the lever. The hub further may be keyed to the shaft 156 positively to preclude relative rotation. A pawl 232 consisting of an arm 234, a transverse driving tooth 236 and an ear 238 is pivoted to the outer end of the lever 224 by means of a shouldered screw 240 threaded into the lever 224. An aperture 242 is provided in the ear 238 and an aperture 244 is provided in the lever 224 adjacent the hub thereof.

A spring 246 is stretched between these two apertures to urge the tooth 236 of the pawl 232 into the relieved portion 226 of the lever for cooperative engagement with the driving surface 216 of the cam 214. When the short arm 200 of the bell crank lever 198 is shifted downwardly, the lever will pivot to drive the chain 208 and hence the sprocket wheel 204 in a counter-clockwise direction as seen in Fig. 17. The driving surface 216 of the cam 214 engages the tooth of the pawl to rotate the lever 224 in a counter-clockwise direction. This rotates the drive shaft 156 a sufficient distance to advance the rods 174 a distance equal to the spacing between them. Subsequent motion of the bell crank lever to its original position rotates the chain 208 and wheel 204 in a clockwise direction. The tooth of the pawl rides over the spiral outer surface of the cam 214 without driving the drive shaft 156.

The delivery shelf

The delivery shelf 138 is practically contiguous with the discharge end 158 of the storage shelf as best may be seen in Figs. 8, 21 and 22. A relatively flat shallow tray 248 (see also Figs. 5, and 23–26) is secured as by welding along the top of the longitudinal angle member 140 of each tray. As heretofore, the single tray 130 will be spoken of only as the three trays are similar. The tray 248 has integral upstanding flanges 250 and 252 at one end and along one side respectively and a longitudinal flange 254 extending along the other edge with the exception of a space near the rear end of the tray.

A pair of rollers 256 is mounted on the center line of the shallow tray 248 by means of a pair of studs 260 with the rollers spaced from one another. A substantially channel shaped shiftable actuating member 258 is mounted for sliding movement on the rollers 256 by means of elongated slots 262 in the bottom of the actuating member 258 which receive the rollers. A longitudinal flange 264 on the actuating member 258 carries a roller 266 which is received in the elongated horizontal slot 268 of a plate 270 secured on the inside of the longitudinal flange 254 of the shallow tray 248. A similar longitudinal flange 272 on the other edge of the actuating member 258 carries a pair of rollers 274. These rollers are carried in horizontol elongated slots 276 of a pair of guide members 278. Each of these guide members is provided with deflected end tabs 280 and the guide members are secured to the bottom of the shallow tray 248 by any suitable means such as welding. A pusher bar 282 having a concave outer end surface 284 and a rearwardly extending attaching arm 286 is secured to the upper surface of the actuating member 258 by any suitable means such as bolts or rivets passing through cooperating apertures 288 in the bottom of the actuating member and in the attaching arm 286.

The actuating member 258 is provided at its rear end with an arm 290 extending longitudinally rearwardly and then upwardly to provide a pivotal mounting connection at 292. Upstanding arms 294 are located at each end of the actuating member 258 and are provided at their top edges with vertically elongated slots 296, thus affording a bifurcated upper end to each arm. Holding plates 298 each having horizontally elongated slots 300 are secured to the rear ends of the arms 294 by screws or bolts. The transversely arranged slots 296 and 300 of the arms and holding plates 298 cooperate to form bearings for a rocker arm shortly to be described.

A stationary longitudinal supporting bracket 302 has a flat top plate 304 and a depending transversely offset flange 306. The forward end of the plate 304 is concave as at 308 to accommodate the delivery drum 96 hereinafter to be described in detail. The bracket 302 is supported by bolts passed through cooperating apertures 310 in the depending flange 306 and in the flange 252 of the shallow tray 248.

A rocker arm assembly 312 is carried by the shiftable actuating member 258 and includes a rocker bar 314 carried by the upstanding arms 294. The construction of the bearings at the tops of the arms 294 as described heretofore is to facilitate insertion of the rocker arm assembly. A plurality of delivery fingers 316 are mounted on the rocker bar 314 for movement therewith and overlie the top of the plate 304. The fingers are substantially J-shaped as the rocker bar and portions of the fingers connected thereto underlie the edge of the plate 304. The fingers are equal in number to the shallow trays 154 of the storage shelf 136, that is to say, five in the illustrated embodiment. The foremost finger 316 has an upstanding bracket 317 providing a sleeve bearing for a pivotable arm 318 having a right angled portion 320. A bottle push off member 322 is fixed to the arm 318 for pivotal movement therewith and a coil spring 324 encircles the arm 318 and exerts a twisting influence on the push off member to maintain it abutting the end finger 316. The arm 318 is provided with a second bearing in a plate 326 upstanding from the extremity of the end finger 316. The push off member 322 is substantially T-shaped in order to engage bottles which may or may not be located centrally on the plate 304 while providing a narrow portion connected to the arm 318. The plate 326 is recessed so that it and the push off member 322 present a flush surface.

The rear finger 316 is provided with a rearwardly extending lug 328 and this lug fits in an arcuate slot 330 in a lever 332 which is substantially a bell crank lever. The lever 332 is provided with an aperture 334 through which a pin is passed to pivot the lever to the upstanding arm 290 of the actuating member 258 at the pivotal location 292 previously referred to. The end of the lever 332 opposite the slot 330 is provided with a forwardly extending lug 336.

A bell crank lever 338 is mounted for rotation on a pivot on the rear of the flange 148. The upstanding arm of the bell crank lever 338 is provided with a forwardly extending lug 340 while the other arm is provided with a rearwardly extending switch actuating stud 342.

A channel member 344 (see also Figs. 27 and 28) extends upwardly from the shallow tray 248 to which it is secured by any desirable means, this member being located relatively toward the front of the tray. A supporting plate 346 is secured above the edge of the shallow tray 248 near the rear end thereof by means of depending legs 348 and 350. Vertical flanges 352 and 354 (see also Fig. 29) are provided along the outer edges of the aforementioned legs and the plate extending thereupon. The flange 354 is secured to the upstanding flange 148 of the rear transverse angle member 144 by means such as a rivet or nut and bolt 355 and the leg 348 is secured to the longitudinal flange 254 of the shallow tray 248 by means such as a screw 357. The flange 352 is directed outwardly away from the main portion of the tray 130 while the flange 354 is directed inwardly. A shaft 356 is pivotally carried by the flange 354. The shaft 356 further is supported by a bearing arm 358 depending from an elongated bracket 360 extending from the supporting plate 346 and braced by a gusset 362. The bracket 360 further is supported by the channel member 344. A yoke 364 having substantially vertical arms 366 and a cross bar 368 extending between them is pivoted on the shaft 356. The yoke extends substantially the entire length of the plate 304 and a depending flange 370 is provided with a plurality of notches 372 which are spaced properly to provide clearance for the fingers 316 as will be apparent hereinafter. The rear arm 366 is provided near its lower end with an elongated slot 374 receiving the lug 340 of the bell crank lever 338. The interfitting of the slot 374 and lug 340 is seen best in Fig. 17. A spring 376 stretching between a point on the upper arm of the bell crank lever 338 and the flange 148 tends to rotate the bell crank lever 338 in a clockwise direction about its pivot 378 as shown in Fig. 17, to position the yoke 364 above the plate 304.

A cam plate 380 is mounted for vertical reciprocation on the outside of the supporting plate 346. A stud 382 extending inward from the upper rear corner of the cam plate 380 extends through an elongated vertical slot 384 in the supporting plate 346 and a washer is held on the other side of the supporting plate by means such as a cotter pin. A similar connection is provided by a stud 386 extending outwardly from the supporting plate 346 and fitting in an elongated vertical slot 388 in the cam plate 380. A washer 390 is held on the stud 386 against the outer surface of the cam plate by means such as a cotter pin. The cam plate thus is supported by the stud and slot connection and is guided for vertical reciprocation thereby. Motion is imparted to the cam plate through the intermediary of a substantially channel shaped bracket 392 having lateral flanges 394 secured to the cam plate as by screws or welding and a central section 396 displaced from the cam plate. The central section is provided with an elongated horizontal slot 398 open at the rear end. The cam plate 380 is provided at its lower rear corner with an actuating finger 400 which is generally offset outwardly from the plane of the cam plate and is turned in at 402 at the lower end. A second actuating finger 404 is offset slightly outwardly from the plane of the cam plate in a relieved area adjacent the vertical slot 388 and has an inwardly directed lower end 406.

A switch actuating cam member 408 is riveted or otherwise suitably secured to the rear edge of the cam plate and extends around the rear of the flange 354 of the supporting plate 346 for cooperation with a switch as will be set forth hereinafter. A cam finger 410 is formed integral with the cam plate a short distance above the switch actuating cam 408 for camming a connecting rod later to be disclosed out of the way when the tray is slid into its inserted position.

A short link 412 is pivoted at one end on the supporting plate 346 and is pivoted at the other end to a relatively long link 414. The cam plate 380 is provided with a cam slot 416 having horizontally offset vertical portions connected by a diagonal offset and the supporting plate 346 is provided with an arcuate slot 418. The pin 420 interconnecting the links 412 and 414 extends through the arcuate slot 418 and the cam slot 416. The other end of the relatively long link 414 is pivoted at 422 to a short link 424 which is in turn pivoted to the upstanding flange 264 of the actuating member 258.

When the cam plate 380 is shifted downwardly by a connecting rod connected to the bracket 392, the links 412, 414 and 424 are shifted from the position shown in Fig. 27 to the position shown in Fig. 28. This action shifts the actuating member 258 and hence the delivery fingers 316 to the left as seen in these figures which is toward the front of the vending machine. A plurality of bottles of milk 426 normally are on the plate 304 and the fingers are shifted a distance equal to the spacing between them to slide the bottles of milk along and deliver the foremost bottle to the delivery drum 96. The foremost bottle must be shifted a distance somewhat greater than the remainder of the bottles and it is for this purpose that the bottle push off member 322 is provided. The right angle portion 320 of the arm 318 carrying the bottle push off member encounters a vertically adjustable stop member 428 depending from the elongated bracket 360 and this causes the bottle push off member to pivot from the position shown in Fig. 24 to and beyond that shown in Fig. 25 to impart the slight additional motion necessary to the bottle to position it in the delivery drum 96. Vertical adjustment of the stop member 428 is possible due to the screw-in-slot connection 430 by means of which it is mounted on the bracket 360 and depending arm 358. A strut 431 connected to the arm 358 braces the stop 428.

As the cam plate 380 approaches the limit of its downward movement the inturned end 402 of the actuating finger 400 strikes the lug 336 to pivot the lever 332 a short distance about its pivot 334 from the position shown in Fig. 31 to the position shown in Fig. 30. This acts through the slot 330 and lug 328 to pivot the rocker bar 314 and the fingers 316 carried thereby through 90° from the position shown in Fig. 31 to the position shown in Fig. 30. During the pivotal movement of the fingers they move through the slots 372 in the yoke 364. Upward movement of the cam plate 380 which is brought about by the same connecting rod that lowered the plate and is augmented by a tension spring 432 connected between a pin 434 on the cam plate and an aperture in the flange 352 of the supporting plate causes reverse actuation of the links 412, 414 and 424 to shift the actuating member 258 back to the position of Fig. 27. As the fingers 316 are in a vertical position at this time they readily clear the bottles 426 remaining on the supporting plate 304. Final upward movement of the cam plate 380 causes the inturned end 402 of the finger 400 to engage beneath the lug 336 of the bell crank lever 332. This pivots the bell crank lever clockwise a short distance and acts through the lug 328 and slot 330 to shift the rocker bar 334 and fingers 316 through 90° of clockwise rotation back to the position shown in Fig. 31. This return motion is augmented by a spring 436 (Fig. 18) stretched between the longitudinal flange 364 of the actuating member and the lug 328. Quiet movement of the cam plate with a minimum of friction is insured by a plurality of dimples 438 struck out of the cam plate and bearing against the supporting plate.

*The driving mechanism*

The bottle advancing mechanism of the storage shelves 136 and the delivery shelves 138 of all three of the trays 128, 130 and 132 are driven by a single motor. The motor is mounted in a box 440 (Fig. 4) in the lower portion of the cabinet beneath the insulated floor 70. The motor shaft 442 (Fig. 14) carries a small pulley 444 which drives a large pulley 446 through the intermediary of a flexible belt 448. The large pulley 446 is fixed to a drive shaft 450 journalled for rotation in a pair of spaced plates 452 upstanding from the floor 70 of the refrigerated compartment and suitably supported from the frame of the vending machine. A drive sprocket 454 is fixed to the drive shaft 450 forwardly of the foremost plate 452 and acts through the endless chain 456 to drive a pair of sprockets 458 and 460 fixed to drive shafts 462 and 464 respectively. The drive shafts 450, 462 and 464 are connected through suitable clutch mechanisms shortly to be described to a plurality of circular drive plates 466, 468 and 470. These plates have connecting rods 472, 474 and 476 pivoted to them respectively at 478, 480 and 482 (see Fig. 9). Each connecting rod, such as the connecting rod 474 in Fig. 10, is provided near its upper end with a headed stud 484 riding within an elongated vertical slot 486 in a bracket 488 suitably secured as by rivets or bolts to the frame of the vending machine. Each connecting rod has at its upper end a forwardly directed tapered pin 490 cooperable with an aperture 492 in the end of one of the bell crank levers 198. When a tray is slid forward by a service man preparatory to filling the tray, the pin 490 readily disengages from the aperture 492 and as readily re-enters the aperture when the tray is slid back into operative position. It is apparent that a single rotation of one of the drive plates 466, 468, 470 will pull the connecting rod down and then push it back up again to actuate the bell crank lever to which it is connected. The bell crank lever in turn actuates the relatively short endless chain to which it is connected, shifting it first in one direction and then in another, with the net result that the longitudinal bars 174 of the proper tray are shifted to deliver a column of bottles to the delivery shelf. A stud 494 is provided on the appropriate plates on each of the connecting rods 472, 474, and 476 to actuate a switch mounted on the frame 126 of the vending machine. These switches will be identified more fully hereinafter, when the electrical circuits of the machine are discussed.

A bevel gear 494 is positioned between the two plates 452 and is secured to the drive shaft 450 by means such as a set screw passing through a hub 496 integral with the gear. A bevel gear 498 is meshed with the gear 494 and is secured to a short shaft 500 by means such as a set screw passed through a hub 502 integral with a gear 498. The shaft 500 is suitably supported by a bearing in a bracket 504 secured to one of the plates 452 and is connected by a clutch connection 506 to a shaft 522 suitably journalled in a pair of plates 510 upstanding from the floor 70 of the vending machine and secured to the frame 136 in any suitable manner. A sprocket wheel 512 is journalled on the shaft 522 to the left of the inner of the two plates 510 and an endless chain 514 passes over this sprocket and over sprockets 516 and 518, the latter two being fixed to the inner ends of short shafts 520 and 508. The outer ends of the shafts 508, 520, and 522 carry circular drive plates 524, 526 and 528 (Fig. 13) similar to the drive plates 466, 468 and 470 heretofore identified. These plates are connected by similar clutch mechanisms shortly to be described to the shafts on which they are mounted for selective rotation thereupon. Connecting rods 530, 532 and 534 are pivoted to the respective drive plates at 536, 538 and 540. The upper end of each of the connecting rods, such as the connecting rod 530 in Fig. 11, has an outwardly offset upper extremity 542 which carries an outwardly directed headed stud 544. This stud fits in an elongated vertical slot or guideway 546 in a bracket 548 fixed as by rivets or bolts to the frame of the machine. An inwardly directed headed stud 550 is cooperable with the horizontal slot 398 in the bracket 392 mounted on the cam plate 380. It may be seen that a single complete rotation of any one of the drive plates 524, 526 and 528 will pull a connecting rod down and then push it back up to deliver a bottle of milk from the selected delivery shelf 138. The connection between the slot 398 and headed stud 550 is readily disconnected when a shelf is partially withdrawn for filling or other purposes and is as readily reconnected. Each of the connecting rods 530, 532 and 534 carries a switch actuating bracket 552 (Fig. 12) for closing the contacts 554 of a switch later to be described with reference to the electrical circuit of the vending machine.

Each of the six clutch mechanisms referred to heretofore is similar, and for purposes of illustration we will describe the clutch mechanism 556 associated with the drive plate 524 as shown in Figs. 15 and 16. When the driving motor of the vending machine is driven, all of the six drive shafts including the shaft 508, are driven through the gearing and sprocket and chain connections as disclosed heretofore. A ratchet wheel 558 is pinned to the shaft 508 by any suitable means for rotation therewith. A pawl 560 is pivoted on the drive plate 524 at 562 and a tooth 564 on the pawl is urged toward the ratchet wheel 558 as shown in dotted lines in Fig. 15 by a tension spring 566 stretched between the pawl and the drive plate.

A lever 568 is pivoted on a stub shaft 570 extending from the plate 510 adjacent the periphery of the drive plate 524. The end of the lever opposite the shaft 570 is pivotally connected at 572 to a link 574 which is in turn pivotally connected to the plunger 576 of a solenoid 578. A lever 568 normally is urged toward the drive plate 524 by a tension spring 580 stretched between the pivot 572 and a pin 582 extending from the plate 510. The lever 568 is provided with an integral arcuate cross member 584 which is provided with three spaced apertures 586. A stud 588 is secured in the aperture 586 which is in the longer arm of the cross member shown in Fig. 15. The tension spring 580 forces the lug 588 into a half round notch 590 in the periphery of the drive plate and the lug bears against a tail 592 of the pawl 560 to retain the tooth 564 of the pawl retracted from the ratchet wheel 558 as shown in full lines in Fig. 15.

Energization of the solenoid 578 will pivot the lever 568 to move the lug 588 from the notch 590 and clear the pawl tail 592. This allows the tooth 564 of the pawl to be brought into engagement with the ratchet wheel by the tension spring 566. Rotation of the ratchet wheel 558 acts through the pawl 560 to rotate the drive plate 524. It should be noted at this time that the pivotal connection between the link 574 and solenoid plunger 576 closes a pair of switch contacts 594 as will be discussed more fully hereinafter with regard to the electrical circuit of the machine. Following the start of rotation of the drive plate 524, the solenoid 578 is de-energized and the lever 568 returns nearly to its original position under the action of the spring 580. The lug 588 rides on the periphery of the drive plate 524 until the notch 590 reaches the lug, at which time the lug strikes the tail 592 of the pawl to disengage the pawl from the ratchet wheel and the lug reseats in the notch 590. It is apparent that once the clutch connection of the pawl and ratchet wheel has been made that the drive plate 524 will rotate through one complete revolution. As may be seen in Fig. 13, the various actuating solenoids 578 are located in somewhat different positions relative to the drive plates with which they are associated and the links and pivotal connections which actuate switch contacts are in somewhat different positions. The lug 588 is located in the appropriate one of the holes 586 as will be apparent. The operation of the clutches associated with the drive plates 466, 468 and 470 is basically similar to that just described.

*The delivery drum*

The three delivery drums 94, 96 and 98 are each associated with one of the vending levels or trays 128, 130 and 132. The drums are identical and explanation thereof will be made with regard to the central drum 96. Referring first to Figs. 32, 36–39 and 44–46, the drum 96 will be seen to comprise a pair of upright spacers 596 which preferably are formed of plastic or like material. The outer longitudinal edges 598 of the spacers 596 are arcuate in form and opposite faces 600 are longitudinally slotted at 602. Four hollow metal columns 604 having arcuate outer surfaces 606 are provided with longitudinal flanges 608 fitting within the longitudinal slots 602 of the spacers 596. The columns are closed at the top by top plates 610 having threaded apertures 612 and at the bottom by similar plates similarly provided with threaded apertures.

A top member or cap 614 is provided for the drum and is formed of plastic or like material similar to the spacers 596. The cap 614 comprises a lower plate 616 substantially circular in form and a smaller circular upper plate 618 spaced from the lower plate and connected thereto by a diametral bridge 620 formed integral with the two plates. The spacing of the two plates by the diametral bridge leaves a pair of like horizontal slots 622. A pair of aligned radical slots 624 is provided in the top plate and parallel offset slots 626 are displaced in the top plate from the slots 624. Various thread screw receiving apertures are provided in the top plate as will be apparent hereinafter. Slots 628 are provided in the lower plate 616 in vertical alignment with the radial slots 624 and slots 630 are provided in vertical alignment with the slots 626. Spaced bores 632 are provided in the lower plate spaced outwardly from the upper plate and the periphery of the lower plate 616 is provided with a pair of symmetrically disposed relieved portions 634.

A pair of top attachment plates 636 are provided for attaching the cap 614 to the hollow columns 604 and to the spacers 596. These plates comprise segments of circles and are provided with depending arcuate flange 638 cooperable with the recesses 634 in the lower plate 616 of the cap. Each plate 636 is receivable in one of the slots 622 between the upper and lower plates and is provided with apertures 640 for receiving screws 642 which pass through these apertures, through the bores 632 in the lower plate, and are threaded into the tapped holes 612 in the top plates of the hollow columns 604. The spacers 596 are held in position by the flanges 608 fitting in the longitudinal slots 602.

The bottom of the drum 96 is completed by a base 644 somewhat similar to the cap and formed of like material, this material preferably being of plastic or like material. Bakelite has been found to be quite satisfactory in practice. The base 644 comprises a circular upper plate 646 and a smaller circular lower plate 648 spaced therefrom by a diametral bridge 650, the spacing leaving slots 652 between the plates. The periphery of the lower plate is provided with a pair of symmetrically disposed notches 654 having protective metal inserts secured therein by any suitable means such as a press fit or an adhesive. The center of the lower plate is provided with a circular recess 656 and an axle bore 658 of small diameter extends upwardly therefrom through the diametral bridge 650 and into the top plate 646. A pair of threaded screw holes 660 further is provided in the lower plate within the recess 656. A circular metal plate 662 fits in the recess 656 and a bushing 664 (Figs. 36 and 37) fits within a central opening 666 in the plate 662 to provide a bearing in the plastic base 644. The plate 662 is held within the recess 656 by screws fitting through apertures 668 in the plate and threaded into the apertures 660 in the base. A pair of headed pins 670 fits within apertures 672 in the base with the shanks of the pins depending through apertures 674 in the plate 662. The pins are capable of being fully retracted by pressure on their free ends so that they will be flush with the plate 662. Normally, the force of gravity causes the shanks of the pins to extend downwardly from the plate 662 with the heads of the pins resting on top of this plate.

The bottom of the drum is completed by attachment plates 676 which are quite similar to the upper attachment plates 636, comprising segments of circles and each having an upstanding arcuate flange 678 cooperable with recesses 680 in the periphery of the upper plate 646. Arcuately spaced apertures 682 are provided for accommodating screws which pass also through aligned apertures in the top plate 646 and are threaded into the lower closure plates (not shown) of the hollow columns 604. It will be seen that assembly of the parts of the drum heretofore disclosed provides a cylindrical drum having a longitudinal diametrical passageway therethrough.

The passageway 684 through the drum is most clearly seen in Figs. 38 and 39 and this passageway is closed by mechanism illustrated in these two figures and also in Figs. 36, 37 and 46. The mechanism includes a pair of closure plates or doors 686 fitting within the passageway. Each of the doors includes an outer plate 688 having an arcuate cross section extending nearly from side to side of the passageway and extending vertically the entire height of the passageway between the cap 614 and base 644. As best may be seen in Fig. 36, this height is somewhat greater than the spacing between the depending and upstanding metal flanges 638 and 678 of the attachment plates which thereby maintain the doors within the passageway against a resilient spring action hereinafter to be disclosed. The outer plate of each door further is provided with longitudinal flanges 690 and with four brackets 692 located adjacent the corners of the plate. The brackets preferably are welded to the plate and each bracket is provided with a threaded screw receiving aperture. Each door further includes an inner plate 694 of substantially channel shape having an arcuate center section 696, longitudinal walls 698 displaced inwardly therefrom, and elongated flanges 700 along the longitudinal edges of the plate. The walls 698 are provided with recesses 702 at the bottom and further are provided with slots 704 aligned with the screw receiving apertures in the bracket 692 on the outer plate. As the screws securing the inner and outer plates together pass through the walls 698 at an angle, the slots 704 are transversely elongated properly to accommodate the screws. A pad 706 of fibre or other insulating material is clamped between the inner and outer plates 688 and 694 when they are secured together and the outer edges 708 of each pad overlie the longitudinal flanges 700 of the inner plate and impinge against the walls of the passageway 684 to provide a substantially air tight insulated joint. A channel or guide track 710 is mounted on the inside of each door by screws passed therethrough and threaded into the inner plate 694. Each channel 710 is provided near its upper end with inturned confronting flanges 712 and is provided at its lower end with parallel ears 714 each apertured for a pivotal connection. The longitudinal side flanges 716 of the channel are spaced farther apart than the ears 714 and legs 718 are secured to the side flanges 716 near the lower end thereof and carry rollers 720 to support the weight of each door so that it readily may move backward and forward in the passageway 684.

The doors are maintained in spaced apart relation by a scissors-like arrangement comprising two pair of elongated bars 722 and 724 pivotally connected at or near their centers by a pin 726. Each pair of bars is maintained in spaced apart relation by transverse rods 728. Shafts or axles 730 are carried at the upper ends of the bars. The shafts or axles 730 carry rollers 732 on their outer ends which fit in the tracks 710 behind the inturned flanges 712. The bars 722 and 724 are apertured at their lower ends at 734 and pins are passed through these apertures and the apertures in the ears 714 at the bottom of the tracks pivotally to connect the bars to the tracks. Tension springs 736 are connected between the vertically aligned upper and lower cross bars 728 and urge the doors 686 away from each other toward the outside of the drum. When one of the doors is pushed in toward the center of the drum, the rollers 732 ride upwardly in the track 712 and the springs are extended so that when the door is released the springs will return it to its normal position substantially flush with the outer wall of the drum. The plastic spacers 596, plastic cap 614 and base 644, insulating mats 706, and various air spaces within the drum provide excellent insulation and practically prevent transfer of heat from the outside to the inside of the refrigerated compartment of the vending machine.

A plate 738 (Figs. 46 and 50) is secured by a screw in a recess between each pair of slots 724 and 726 in the cap 614. Each such plate includes a pin 740 fitting in a recess in the upper plate. A small sheet metal section 741 is secured by screws above each such recess. A locking finger 742 is pivoted on each of these pins and has an upwardly extending tail 744 and a down turned nose 746 extending through the aligned slots in the attachment plate 636 and the lower plate 616. The end of each nose 746 is flat as at 748 and normally lies behind the door with which it is associated, as seen on the right side of Fig. 50.

Each plate 738 further carries a pin 752 fitting in a transverse recess adjacent the rear of slot 626. A sheet metal section 750 overlies each such recess and is secured in position by screws. Pins 752 pivotally support switch actuating fingers 754 within the slots 626 and those aligned therewith. Each of the fingers 754 has a depending foot 756 provided with a curved lower surface which normally rests atop the associated door 686 as shown at the right in Fig. 51. Each finger 754 further is provided with a transverse ear 758 which limits downward movement of the finger 754.

Figure 2:
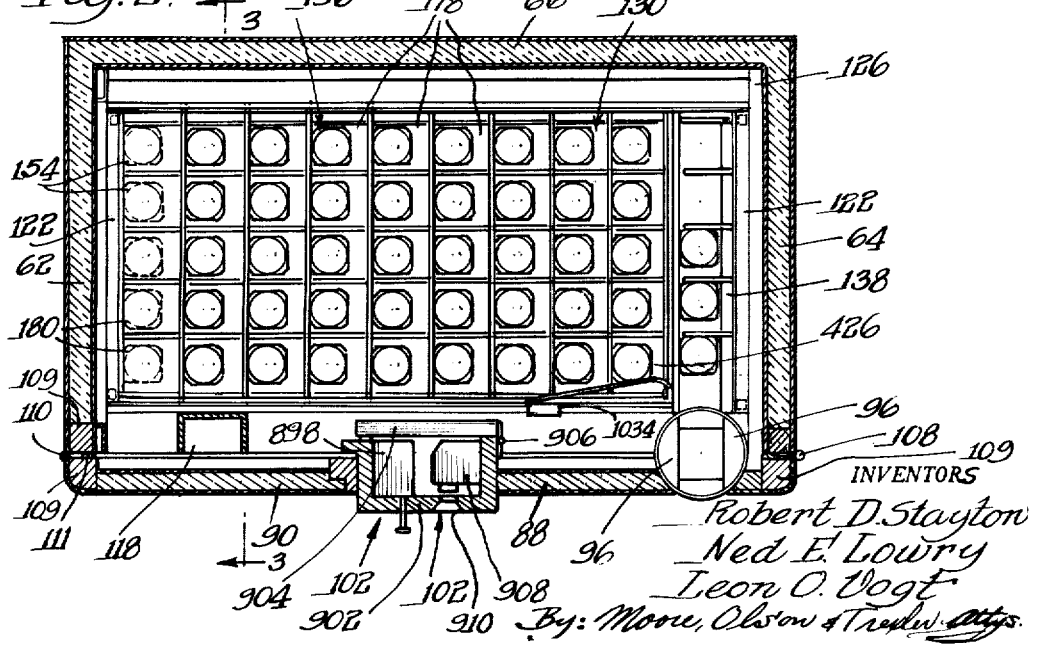
Fig. 2 is a horizontal sectional view taken through the cabinet and showing one of the vending sets or levels as taken along the line 2—2 of Fig. 3.

The drum is mounted in the door extending slightly forwardly therefrom and a considerable distance rearwardly as best may be seen in Figs. 2 and 8. The drum is supported at its top end by a bracket 760 (Figs. 32, 33, 36, 37, 50 and 51) suitably secured to the frame 762 of the door 88. The bracket is provided with depending flanges 764 at each end and it is by means of these flanges that the bracket is attached to the frame 762 through the use of bolts or rivets or other suitable fasteners. A stub shaft 766 is fixed to the bracket 760 and depends substantially centrally therefrom. A cam 768 is secured about this pin and is spaced slightly from the bracket by a spacer 770. The cam 768 is generally circular in form with the exception of an outwardly extending flange 772 of substantial arcuate extent and the cam is secured against rotation. The shaft 766 fits within a metal bearing 774 fitting in a suitable axial recess in the drum cap 614. The bracket 760 further is provided with a depending ear 776 (Figs. 33 and 35) adjacent the locus of the periphery of the drum and a pawl 778 is pivoted on this ear. A coil spring 780 urges the pawl constantly downward. A plurality of spaced apertures 782 are provided in the metal attachment plates 736 atop the drum for receiving the tip of the pawl 778. When a force is exerted on a drum tending to rotate it in one direction, the pawl resists such a rotation, but when a force is exerted on a drum tending to rotate it in the other direction the pawl is cammed out of whichever aperture 782 it is in and the drum rotates.

Further structure carried by the bracket 760 includes a pair of depending ears 784 spaced apart a distance somewhat greater than the diameter of the drum. These ears pivotally carry a rod 786 having a horizontal length 788 and an actuating length 790 integral therewith and at substantially right angles thereto. A depending length 792 is integral with the other end of the horizontal length 788 and has a deflected portion 794 at its lower end. The actuating length 790 has a flat end 796 which is held in raised position by the ear 758 of one of the switch actuating fingers 754 as shown on the right side of Fig. 51. When the door 786 is pushed inwardly as shown on the left side of Fig. 51, the finger 754 drops and the bar 786 pivots due to gravity. When the flattened end 796 of the bar 786 is held in raised position, the deflected lower end 796 holds a switch actuating lever 798 in switch closing position. When the finger 754 drops and the rod 786 pivots, the lever 798 is allowed to move to switch open position. The significance of this will be explained hereinafter with regard to the electrical circuit of the vending machine.

The drum is supported at its lower end by a bracket 800 (Figs. 32, 36, 37, 42, 43 and 48) having upturned end flanges 802 suitably secured to the door frame 762 by rivets or bolts or the like. The left horizontal portion of the bracket 800 is lifted a slight distance above the remaining horizontal portion of the bracket by an offset 804 and the central section 806 is enlarged to present a substantially octagonal configuration. An upstanding axle 808 is carried by the central section 806 and this axle carries a gear 810 to which is pinned a circular disc 812. A bushing 814 is included between the axle 808 and the gear and disc. The gear 810 fits next to the offset 804 and the disc 812 rides slightly above the left horizontal portion of the bracket 800. The disc is provided with a pair of upwardly deflected fingers 816 terminating in apertures 818. The fingers extend upwardly from the disc at a shallow angle with no point of sharp inclination so that the upper surfaces of the fingers may act as cam surfaces.

A pivot pin 820 is carried by the bracket in the central section adjacent the right edge thereof and extends upwardly and downwardly from the plane of the bracket. A bell crank lever 822 having a short arm 824 and a long arm 826 is pivoted on this pin beneath the bracket and a roller 828 is carried on the end of the long arm 826 and is cooperable with the pusher bar 282 of the delivery tray as will be apparent hereinafter. The long arm 826 of the bell crank lever 822 also carries a gear sector 830 which is pinned to the upper surface of the long arm and fits in an arcuate aperture 832 in the central section 806 of the bracket 802, the arcuate extent of the aperture being nearly twice that of the gear sector. The teeth of the gear sector 830 mesh with the teeth of the gear 810 to drive the drum as will be apparent hereinafter. A link 834 is pivotally connected to the extremity of the short arm 824 of the bell crank lever and to the actuating rod 836 of a dash-pot 838. A tension spring 840 is stretched between an ear 842 on the link 834 and a lug 844 on the dash-pot mounting bracket 846 (Fig. 49). The dash-pot mounting bracket 846 includes a horizontal flange 848 on which the dash-pot is mounted directly, a vertical side flange 850 and a vertical end flange 852, the latter being secured by bolts, rivets or other suitable fasteners to the frame 762 of the door 88. The spring 840 normally acts to maintain the bell crank lever 822 and gear sector 830 in the position shown in Fig. 42.

A drive pin 854 extends upwardly from the short arm 824 of the bell crank lever near the pivot of the bell crank and fits in an arcuate slot 856 in the bracket 800. A wedge shaped plate 858 is pivoted on the pin 820 above the bracket 800 and in contact therewith and the plate 858 is provided with an arcuate slot 860 of lesser extent than the arcuate slot 856. The slot 860 receives the drive pin 854 on the short arm 824 of the bell crank lever, the slot connection in the plate providing a lost motion connection. One corner of the plate 858 carries a roller 862 rotatably mounted on a pin extending upwardly from the plate.

A pivot pin 864 extends up from the bracket 800 near the right end thereof and carries a cam arm 866, a sleeve bearing 868 being included between the pin 864 and the cam arm 866. The cam arm is generally arcuate in form and has at its end an upstanding finger 870 receivable in the notches 654 of the drum base (Fig. 41). A coil spring 872 normally urges the cam arm 866 in a clockwise direction toward the drum. The inner edge of the cam arm 866 is engaged by the roller 862 on the wedge shaped plate 858 and includes a scallop 874 and a notch or stop 876. A switch actuating finger 878 extends transversely outwardly from the cam arm 866 and carries on its outer end a button 880 engageable with switch contact arms 882 of a switch later to be described with regard to the electrical circuit of the vending machine.

Further constructional features associated with the drum include wipers 884 (Fig. 38) of felt or the like secured on brackets 886 suitably mounted on the door frame 762. The wipers resiliently impinge against the periphery of the drum and prevent the escape of air past the edges of the drum. An arcuate box-like projection 888 (Fig. 36) extends out from the face of the door 88 above the top of the drum 96 and a felt wiper 890 is carried therein bearing against the top of the drum. A similar box-like projection 892 underlies the drum 96 and carries a felt wiper 894. These felt wipers further prevent transfer of heat past the drum to the interior of the refrigerated compartment of the vending machine.

When the fingers 316 of the delivery shelf are shifted toward the front of the vending machine as disclosed heretofore, the additional motion imparted to the front bottle 426 by the bottle push off member 322 moves this bottle into the passage-way of the drum, the door 686 moving inwardly against the action of springs 736 as shown in Fig. 39. As the tail of the pawl 742 (Fig. 50) is held down by the extending flange 772 of the cam 768, the nose 746 of the cam is not behind the door and the door is free to open. It should be noted that the outer door is held in closed position by the other pawl 742. Inward movement of the door 686 allows the switch actuating finger 754 to drop and this allows the bar 786 to pivot to open a switch as will be discussed later.

At the same time that the bottle is pushed into the drum, the pusher bar 282 on the actuating member 258 of the delivery shelf is shifted longitudinally to engage the roller 828 on the bell crank lever 822 to shift the bell crank lever against the action of the spring from the position shown in Fig. 42 to that shown in Fig. 43. It should be noted that the outer end of the long arm 826 of the bell crank lever is offset downwardly to provide clearance for the pusher bar 282. This movement of the bell crank lever acts through the gear sector 830 to rotate the gear 810 through an arc of slightly greater than 180°. The upwardly directed fingers 816 of the disc 812 pinned to the gear cam the pins 670 in the base of the drum upwardly into the base with no tendency to rotate the drum.

As the bell crank lever approaches the position of Fig. 43 the pin 854 pivots the wedge shaped plate 858 and the roller thereon engages the cam surface of cam arm 866 to pivot this arm about the pin 864 to retract the finger 870 from the notch 654 in the bottom of the drum and further to cause the button 880 to engage the switch contacts 882. Withdrawal of the finger 870 from the notch 654 leaves the drum free to turn, but it can turn in only one direction due to the pawl 778. As the pusher bar 282 moves back to its original position with the actuating member 258 as set forth heretofore, the bell crank lever is free to move back toward its original position as shown in Fig. 42 under the action of the spring 840, this action being damped by the dash-pot 838. Such movement of the bell crank lever acts through the gear sector 830 to rotate the gear 810 and the disc 812 pinned thereto in the opposite direction. The pins 670 having moved slightly past the ends of the fingers during the cocking of the spring 840 are in extended position and are engaged by the notches or apertures 818 in the ends of the fingers 816 so that the drum is rotated through 180° with the gear and disc. Pivoting of the bell crank lever toward its original position pivots the wedge shaped plate 858 back toward its original position and frees the cam arm 866 which allows the spring 872 to pivot the arm and seat the finger 870 in the next notch 654 following 180° of rotation of the drum. The bottle 426 which was within the drum on the inside of the vending machine cabinet now is on the outer side and readily may be removed by the purchaser. Removal of the bottle allows the door 686 to close under the action of springs 736. Closing of this door cams the locking finger 742 upwardly until the door is past the nose of the finger. At this time the nose 746 of the finger drops down behind the door with the flat end 748 of the nose impinging against the door and holding it in closed locked position. Similarly, the switch actuating finger 754 is cammed upwardly to pivot the rod 786.

Damage to the delivery mechanism due to stopping of the drum during a delivery cycle is positively precluded by the positive cocking and spring actuation of the drum. If the drum is stopped manually, the spring 840 merely remains under slightly greater than normal tension until the drum is released at which time it completes its 180° turn. The pawl 778 engaging any one of the apertures 782 prevents the drum from being rotated reversely and the drum cannot be rotated forwardly beyond its proper position due to the locking finger 870 and notches 654.

*The coin mechanism*

Each of the coin mechanisms 100, 102 and 104 (Figs. 1 and 2) includes a coin slot 896 leading into a slug rejector 898. Each such slug rejector is of conventional construction and includes the usual mechanisms for testing the weight, hardness, electrical conductivity, and other coin parameters as is well known in the art. Good coins drop through a chute (not shown) to a cash box (not shown). Coins which are rejected drop through a chute to a common coin return 106. Operting buttons 900 are provided for freeing jammed coins as will be understood. All of the coin mechanisms are mounted in a channel shaped portion 902 in the door 88 along the vertical midsection of the vending machine cabinet and are secured by any suitable means to the frame of the door. The channel is closed on the inside by a door 904 hinged at 906 and provided with any suitable latch mechanism.

Each coin mechanism further includes an indicating mechanism 908 (Figs. 52–55) each being mounted for cooperation with an aperture 910 in the door to one side of the coin slot. Each indicating mechanism 908 includes a mounting plate 912 suitably secured to the door frame and further includes an arm 914 mounted for swinging movement on a pivot 916 carried by the mounting plate 912. Each arm 914 includes a head 918 having abutment edges 920 and 922. Each arm carries a sheet metal section 924 turned down at its outer end to provide a pair of angularly disposed indicating faces 926 and 928, the former being labeled "empty" and the latter being labeled "full." A coil spring (not shown) about the pivot 916 of the arm normally urges the arm in a counter-clockwise direction and movement in this direction is limited by engagement of the arm 914 with a stop 951 carried by the mounting plate 912. An electromagnet 932 is located to the right of the arm 914. An armature 934, movable by the electro-magnet, is pivoted on the mounting plate 912 at 936 and has a tooth 938 cooperable with the abutment edge 920 to maintain the arm in the clockwise adjusted position shown in Fig. 54 with the abutment edge 922 nearly engaging the stop 930. In this position the "full" label appears in the aperture as will be apparent. A tension spring 940 is stretched between a pin 942 on the mounting plate 912 and an aperture in the tail 944 of armature 934.

The head 918 of the arm 914 carries a roller 946 which engages with a switch arm 950 when in the position shown in Fig. 54 to close a plurality of switch contacts as will be apparent hereinafter. Energization of the electro-magnet 932 pivots the armature 934 to remove the tooth 938 from the abutment edge 920 of the head 918 and the coil spring about the pivot 916 causes the arm 914 to pivot from the full position shown in Fig. 54 to the empty position shown in Fig. 52, movement being limited by a stop 951 positioned on the mounting plate 912. The electro-magnet is energized when the particular vending level or tray associated with that indicating mechanism is exhausted as will be apparent hereinafter.

*The electrical circuit*

The electrical wiring diagram is shown in Fig. 56. The various switches in the diagram appear in certain of the foregoing figures as will be pointed out. Others of the switches and relays which are not shown except in the wiring diagram are located on a common shelf in the bottom of the vending machine cabinet. The input of a conventional single phase alternating current power line is indicated at 952 and 954. From 952 the circuit proceeds through a main door switch 956 to a line 958. The main door switch 956 is shown in Fig. 3 and is mounted directly beneath the door 90. A switch actuating lever 960 lies atop a switch actuating plunger which is spring pressed upwardly. When the door is closed the lower portion thereof engages the switch actuating lever 960 to hold the plunger down and this in turn holds the switch contacts in closed position as shown in Fig. 56. When the door is pivoted, the switch actuating lever 960 is free and the plunger moves upward under the action of its spring to open the switch contacts. Possible operation of the machine when the cabinet is open and ensuing danger to the service man or operator and the hazard of electrical shock positively are precluded by this switch.

The line 958 continues to a delivery disc switch 962. This switch is shown in Figs. 12 and 13 and is the switch having the contacts 554. These contacts normally are held closed by the cam finger 552 on one of the connecting rods as 530 and open when the connecting rod is shifted. (It is to be understood at this point that there is a separate and identical wiring diagram for each of the three delivery levels with the exception of certain of the common parts as will be pointed out hereinafter.)

A line 964 leads from the delivery disc switch 962 to a reserve disc switch 966 shown also in Fig. 9. The switch contacts 968 of the switch 966 normally are held in closed position by the pin 494 on any of the reserve actuating connecting rods 472, 474 and 476. Shifting of the connecting rod allows the switch contacts to open.

From the reserve disc switch 966 a line 970 leads to an equalizer switch 972 shown in Figs. 32-34. This switch has a plunger 974 normally spring pressed outwardly against the switch arm or lever 798. The switch arm 798 normally holds the plunger depressed which maintains the contacts of the switch 972 closed due to the pressure of the operating bar or rod 786, the flat end 796 of which is held in raised position by the switch actuating finger 754 as shown in Fig. 51. As noted heretofore, dropping of the finger 754 allows the rod 786 to pivot and this allows the contacts of the switch 972 to open.

From the equalizer switch 972 a line 976 runs to a drum lock switch 978 shown in Figs. 42 and 43 and having the switch arms or contacts 882. The contacts normally are closed and are pivoted by the button 880 carried on the finger or arm 878 of the cam arm 866 when this arm is pivoted by cocking of the drum rotating mechanism to release the drum for rotation.

From the switch 978 a line 980 leads to a clutch relay coil 982 which in turn is connected to a clutch relay switch 984 having contacts 986a, 986b, and 986c and contacts 988a, 988b and 988c. The clutch relay coil and switches are mounted in the bottom of the vending machine cabinet and do not appear in any of the figures except the wiring diagram. The switch contact 988b is connected through the delivery clutch solenoid 578 shown in Fig. 13 to the line 980. A wire 990 connects the switch contacts 986c and 988c with one another and with a line 992 which is connected to one end of a holding coil 994. The other end of the holding coil is connected to the line 980. The holding coil 994, which does not appear in any of the drawings except Fig. 56, is located in the coin mechanism, as 102, for cooperation with the coin slot 896 and slug rejector 898. The mechanism will accept a coin when this coil is energized but will not accept a coin when not energized, the coin in the latter instance dropping to the coin return chute or aperture 106. The switch contacts 986a and 986b are normally in contact with one another as are the switch contacts 988a and 988b. Energization of the clutch relay coil 982 moves the contacts so that the contact 986b moves away from the contact 986a and into contact with the contact 986c. Simultaneously, the contact 988b moves away from the contact 988a and into engagement with the contact 988c. The switch contact 988a is a dead contact, that is to say it is not connected to anything.

The switch contact 986a is connected by means of a wire 996 to a line 998 leading to a normally open coin switch 1000. The coin switch is not shown in any of the other drawings but is contained in the coin mechanism, as 102, and is closed momentarily by a coin which has been passed by the slug reject mechanism. Coin switch 1000 further is connected by a wire 1002 to a line 1004 leading to the lower end of the holding coil 994 and to the line 992. The line 1004 further leads to an empty or out relay switch 1006. This switch is shown in Figs. 52 and 54 and is closed when bottles are in the vending level with which it is associated and is open when the level is empty.

A line 1008 leads from the switch 1006 to the A.C. input 954. A wire 1010 leads from a line 1008 to a timer solenoid 1012 located in the bottom of the vending machine cabinet. A wire 1014 leads from the timer solenoid to a time coil switch 1016. The switch 1016 is shown also in Figs. 13 and 15 and includes the contacts 594 actuated by the pin carried by the plunger 576 of the solenoid 578. These switch contacts normally are open and are closed by the aforesaid pin upon energization of the solenoid. Switch 1016 is connected through a line 1017 to line 958.

Three wires 1018 lead from each of the three lines 1008 to a single drive motor 1020, this drive motor being located within the box 440 of Fig. 4 in the bottom of the vending machine cabinet. A wire 1022 leads from the motor to a timer switch 1024. The timer switch is normally open and is closable by energization of any or all of the timer solenoids 1012. A clockwork mechanism (not shown) opens the switch 1024 a predetermined time after closing. A single wire 1026 leads from the timer switch 1024 to the line 958.

From the line 964 at the bottom of the delivery disc switch 962 a line 1028 leads to a reserve clutch solenoid 1030. These solenoids are not shown in any of the drawings except Fig. 56 but are associated with the clutch mechanisms selectively connecting the drive shafts 450, 462 and 464 to the drive plates 466, 468 and 470 respectively. As noted heretofore, these clutches are substantially identical with the clutch 556 illustrated in detail in Figs. 15 and 16 and it is to be understood that the solenoids and connecting levers are similar to those shown in these figures. The reserve solenoid 1030 is connected by means of a line 1032 to an empty switch 1034 having contacts 1034a, 1934b and 1034c. The switch 1034 is shown in Figs. 2, 8 and 21 and is located adjacent the storage shelf 136. The switch is mounted by means of a bracket 1036 and suitable fasteners on the upstanding flange 146 of the tray 130. A switch actuating lever 1038 is pivoted on a pin 1040 carried by the bracket 1036 and a spring (not shown) urges the arm outwardly in a counter-clockwise direction as shown in Fig. 8. Pivoting of the switch lever or arm 1038 past the position of Fig. 8 is limited by the upstanding flange of a bracket 1042 mounted on the bracket 1036. The switch lever 1038 actuates a switch member 1044 to hold the contacts 1034a and 1034b in engagement when the lever 1038 impinges against bottles 426 on the storage shelf 136 as shown in Fig. 2. When no bottles are present on the storage shelf, the lever 1038 swings outwardly to the position shown in Fig. 8 under the action of its spring and acts through the switch member 1044 to disengage the contacts 1034a and 1034b and to bring the contact 1034b into engagement with the contact 1034c. Movement of the switch actuating lever 1038 in a clockwise direction a distance sufficiently far to damage the arm or switch 1034 is precluded by an upstanding plate 1046 suitably secured to the flange 146. The plate 1046 is provided with curved extensions 1048 projecting toward the path of bottles on the delivery shelf to insure centralization of bottles and therefore proper delivery thereof to the drum 96.

The switch contact 1034b is connected by a wire 1050 to a reserve actuating switch 1052 which is in turn connected by a wire 1054 to the line 1004. The reserve actuating switch 1052 is shown in Fig. 17 and is normally open. The contacts of switch 1052 normally are open but are closable by the switch actuating stud 342 of the bell crank lever 338 impinging thereagainst. The bell crank lever is urged by the spring 376 in a clockwise direction as shown in Fig. 17 to tend to close the contacts of switch 1052. This movement is resisted by the linkage of the bell crank lever to the yoke 364 when bottles are on the delivery shelf. A bottle anywhere along the shelf will hold the yoke pivoted to the left of the position shown in Fig. 17 and to the right of the position shown in Fig. 22, these figures being taken from opposite sides of the particular vending level. When no bottles are present in the delivery shelf, the spring 376 acts through the bell crank lever 338 to swing the yoke to the position shown in Fig. 22. This allows the switch actuating stud 342 to close the contacts of switch 1052.

A line 1056 leads from the line 958 to an empty or out relay coil which comprises the solenoid or electro-magnet 932 shown in Figs. 52 and 54. A line 1058 leads from the other end of the empty relay coil 932 to an empty or out relay switch 1060 which is the switch mounted contiguous to the switch 1006. The switch 1060 further is connected by a line 1061 to the contact 1034c of switch 1034. Another line 1062 leads from the empty relay coil 932 and also from the line 1058 to an anti-jack pot switch 1064. The anti-jack pot switch is shown also in Figs. 27 and 28 and is mounted in any suitable manner on the frame of the vending machine. The contacts of this switch normally are open but are closed by engagement of the cam 408 carried by the cam plate 380 with a roller 1066 carried by one of the contacts and switch 1064, the cam plate being shifted in a manner heretofore set forth.

It has been noted heretofore that switches 186, 188 and 190 (Figs. 5 and 7) are carried on insulating plates 182 and 184 respectively mounted on the flange 148 of one of the trays, as 130 and on the frame 126 of the vending machine. The contacts of these switches are opened by withdrawal of the shelf from its operative position for loading or for any other purpose. This positively precludes operation of any part of the apparatus and further makes it possible to remove the tray entirely from the machine as there are no connecting wires between the tray and the remainder of the vending machine. These switches 186, 188 and 190 are shown in the wiring diagram of Fig. 55 in the lines 1032, 1050 and 1061.

To prevent any possible misunderstanding of the singularity or triplication of the various parts shown in the wiring diagram of Fig. 55, it is to be understood at this point that the drive motor 1020, wire or line 1022, timer switch 1024 (and its associated clockwork mechanism), the wire or line 1026, the main door switch 956 and the A.C. inputs 952 and 954 occur once only. The remaining parts shown in the wiring diagram and the mechanical parts associated therewith are triplicated. That is to say, each part occurs three times, one for each vending level or tray of the vending machine.

*Summary of operation*

The details of operation of the various mechanical parts have been set forth heretofore along with the description of the parts. Therefore this description of operation is concerned mostly with the sequence of the various operations and refers to the mechanical operations only in a rather general way.

Assuming the machine to have been loaded recently and the doors 88 and 90 to have been closed, it is apparent that the switch 956 will be held closed by the door 90. The switches 186, 188 and 190 are closed due to the tray 130 being in inserted operative position (referring again to the middle vending level or tray 130 for illustrative purposes). The empty or out switches 1006 and 1060 have been closed by the operator and the "full" panel 928 appears in the aperture 910. When a coin of proper denomination is inserted in the coin slot 896 and passed by the slug rejector mechanism 898, the coin momentarily closes the coin switch 1000. This completes the following circuit: A.C. input 952 through switch 956 to line 958, through switch 962 to line 964, through switch 966 to line 970, through switch 972 to line 976, through switch 978 to line 980, through clutch relay coil 982, switch contacts 986a and 986b to line 996, line 998 through coin switch 1000 to line 1002, line 1004 through out or empty relay switch 1006 to line 1008, and from there to A.C. input 954. The coin switch 1000 is closed only momentarily, but this closing is long enough to cause clutch relay coil 982 to shift switch contact 986b from 986a to 986c, and to shift switch contact 988b from 988a to 988c. This completes a circuit similar to that set forth above as far as the line 980. The circuit is then completed in three parallel branches to the line 1004 and from there to A.C. input 954 as enumerated above. The three parallel branches are as follows: (1) clutch relay coil 982, switch contacts 986b and 986c, wire 990, and line 992; (2) delivery clutch solenoid 578, switch contacts 988b and 988c, and line 992; (3) holding coil 994. It should be noted that the circuit through the holding coil 994 is completed at all times when the machine is plugged in so that a coin may be accepted except when the circuit is broken therethrough by a delivery operation as will be apparent hereinafter. When the machine is not plugged in, the coil is not energized and a deflector plate (not shown) prevents acceptance of a coin.

Energization of the delivery clutch solenoid 578 causes engagement of the clutch mechanism 556 (Figs. 15 and 16) and closes the switch contacts 594 of time coil switch 1016. This completes a circuit from A.C. input 952 through switch 956 to line 958, from there to switch 1016 through line 1017, through timer solenoid 1012 to line 1010, and from there through line 1008 to A.C. input 954. Closing of the circuit through timer solenoid 1012 winds the time clock mechanism (not shown) and closes timer switch 1024. A circuit then is completed from A.C. input 952 through switch 956 to line 1026, through timer switch 1024 to line 1022 and continues to drive motor 1020, and from drive motor 1020 through lines 1018 and 1008 to A.C. input 954. The motor then runs until the timer switch 1024 is opened by the time clock mechanism. In a practical embodiment of my vending machine, the timer maintains the motor in operation for approximately three-fourths of a minute.

The motor 1020 acts through the various mechanical links set forth heretofore to rotate the drive plate 524 to pull connecting rod 530 (Figs. 13 and 15), down and then push it back up. As set forth hereinbefore, this pulls cam plate 380 down from the position shown in Fig. 27 to the position shown in Fig. 28 and then shifts it back to the position shown in Fig. 27. This causes the actuating member 258 of the delivery shelf to shift toward the delivery drum 96 and acts through the intermediary of the fingers 316 and bottle push off member 322 to deliver a bottle 426 into the drum 96 as shown in Figs. 32 and 39. The pusher bar 282 also shifts with the actuating member toward the drum to cock the actuating mechanism of the drum. Cocking of the drum actuating mechanism causes the locking finger 870 to be removed from the notch 654 in the base of the drum. This causes the drum lock switch 978 to be opened and prevents further energization of the circuit should another coin be inserted. Energization of the circuit further is prevented by opening of the delivery disc switch 962 operated by the cam finger 552 on the connecting rod 530 (Figs. 12 and 13). The drum then rotates through 180° to present the bottle of milk 426 on the outside of the vending machine cabinet. As soon as the drum starts to rotate, the flat end 796 of the switch actuating rod 786 drops from the switch actuating finger 754 and the equalizer switch 972 is opened. This switch is not again reclosed until the bottle 426 is removed from the drum to allow the door 636 to close and lift the switch actuating finger 754 as shown on the right side of Fig. 51. The drum lock switch 978 is reclosed only if the drum is turned through the entire 180° of rotation necessary to allow the locking finger 970 to enter the next notch 654 in the base of the drum. When the drum has so rotated and the bottle has been removed, the circuit is in condition for another delivery cycle to be instituted. The motor 1020 has not at this time stopped running which is a desirable feature for it prevents frequent stopping and starting of the motor during heavy duty periods such as occur at lunch hours. If another cycle is not instituted by the insertion of a further coin, the motor will stop due to the time clock mechanism a reasonably short time after the completion of the delivery cycle.

After the last bottle 426 has been delivered from the delivery shelf in the manner just set forth, the yoke 364 is free to swing outwardly above the delivery shelf as indicated in Fig. 22. This causes the reserve actuating switch 1052 to be closed and completes the following circuit (it being understood that the motor 1020 is still running under the control of the time clock mechanism); A.C. input 952 through main door switch 956 to line 958, through delivery switch 962 (this switch having been reclosed by the return of connecting rod 530 to its orignal position), line 1028 through reserve solenoid 1030 to line 1032, through the contacts 1034a and 1034b of empty switch 1034 to line 1050, through the now closed reserve actuating switch 1052 to line 1054, from there to line 1004, through empty or out relay switch 1006 and line 1008 to A.C. input 954. Completion of the circuit through reserve solenoid 1030 clutches the drive plate 1068 to the connecting rod 474 and pulls this rod down and then pushes it back up to its original position. This acts through the mechanism heretofore described to shift the longitudinal bars or rods 174 a distance equal to the spacing between them to shift a longitudinal column 178 of bottles 426 from the reserve or storage shelf 136 on to the delivery shelf 138. This column of bottles shifts the yoke 364 and re-opens the reserve actuating switch 1052. During the shifting of the bottles from the reserve or storage shelf on to the delivery shelf, the reserve disc switch 966 is opened by movement of the pin 494 on the connecting rod 474 away from the switch contacts 968. Further actuation positively is precluded by momentary opening of the contacts 1034a and 1034b of the empty switch as the switch lever arm 1038 swings outwardly between columns of bottles. It is apparent that greater power is required to shift bottles from the reserve or the storage shelf on to the delivery shelf than is necessary to shift the bottles along the delivery shelf. Therefore the actuation of the delivery mechanism first allows the motor 1020 to start against a relatively light load and then to assume the heavier load while it is already running. When the last longitudinal column of bottles has been shifted from the reserve or storage shelf on to the delivery shelf, the switch actuating lever arm 1038 swings out to the position shown in Fig. 8 and the empty switch contact 1034b shifts from the contact 1034a to contact 1034c. The next time that the last bottle is shifted from the delivery shelf and the yoke 364 is allowed to swing out to close the reserve actuating switch 1052, a circuit is completed momentarily as follows: A.C. input 952 through main door switch 956 to line 958, line 1056 through empty or out relay coil 932 to line 1058, from there through empty or out relay switch 1060 to line 1061, from there through empty switch contacts 1034b and 1034c to line 1050, through reserve actuating switch 1052 and line 1054 to line 1004, through empty or out relay switch 1006, and from there through line 1008 to A.C. input 954. The momentary energization of out relay coil 932 retracts armature 934 (Figs. 52 and 54) to allow empty or out relay switches 1006 and 1060 to open. This opens the circuit through the empty or out relay coil 932 and further opens the main circuit between line 1004 and line 1008 to prevent further energization of the circuit. The later opening also de-energizes holding coil 994 and allows a deflecting plate to drop into position to prevent acceptance of further coins.

Under some conditions of operation a coin will jam and hold the contacts of the coin switch 1000 closed. This would cause the circuit originally set forth under the description of operation to be re-established at the completion of each cycle and the machine would continue to deliver bottles of milk until empty. As is well known in the trade, this known as jack-potting. In the apparatus disclosed, jack-potting is prevented by the anti-jack-pot switch 1064. This switch is closed by the cam bar 408 each time the cam plate 380 is reciprocated to deliver a bottle from the vending level selected. If the coin switch 1000 is held closed, a circuit is completed between lines 958 and 1004 as follows: line 1056, empty or out relay coil 932, line 1062, anti-jack-pot switch 1064, line 998, coin switch 1000, and line 1002. This causes the empty or out relay switches 1006 and 1060 to open and prevents further operation of this level of the machine until the machine is refilled and the operator resets the out relay switches 1006 and 1060.

If coins are dropped into more than one level of the vending machine concurrently or successively, as will happen during periods of heavy demand, the operations described heretofore will occur in all of the levels receiving the coins. Each cycle will be completed without difficulty as the drive motor will continue to run under the influence of the time clock mechanism until the time set by the last coin to be dropped expires. The ability of the various levels to operate concurrently in any time relationship allows a large number of bottles to be delivered in a very short time. Emptying of any one or more levels of the machine obviously does not effect the operation of the remaining level or levels.

It will be seen that the objects of our invention have been attained herein. The vending machine disclosed has a high capacity and can deliver a large quantity of articles, preferably bottles of milk, in a short time. The only physical effort required by a purchaser is the dropping of a coin. The bottle of milk or other article is presented in clean upstanding fashion to the purchaser in such condition as to satisfy the most fastidious. The machine is practically fool proof in operation and is essentially tamper proof. Various interlocks are provided to prevent the initiation of one cycle before the preceding cycle has stopped (with the exception that the motor may not necessarily come to a stop between delivery cycles). As bottles are delivered from the storage or reserve shelf onto the delivery shelf in response to absence of bottles in the latter there is no chance of shifting a column of bottles on to the delivery shelf when so much as one bottle remains on the shelf. It is apparent that if such shifting were allowed, a jam and considerable damage to the mechanism would result.

Although a particular practical embodiment of the invention has been shown and described, it is to be understood that this is for illustrative purposes only and that the invention is to include all that which falls in the spirit and scope of the appended claims.

The invention is hereby claimed as follows:

1. A vending machine including elongated delivery means, a stationary storage shelf arranged transversely of said elongated delivery means, means extending transversely across said stationary storage shelf for shifting articles to be vended from said storage shelf on to said elongated delivery means, an oscillatable endless chain, means for coupling said chain when moving in one direction to said transversely extending means, motor means, lever means coupled to said chain, and means for periodically coupling said lever means to said motor means to effect the shifting of articles on said storage shelf.

2. A vending machine including elongated delivery means, a stationary storage shelf arranged transversely of said elongated delivery means, means extending transversely across said stationary storage shelf for shifting articles to be vended from said storage shelf on to said elongated delivery means, motor means for effecting the shifting of articles to be vended, an oscillatable endless chain, means for coupling said chain when moving in one direction to said transversely extending means, a lever for oscillating said chain, a connecting rod coupled to said lever, and means for periodically connecting said connecting rod to said motor including means for oscillating said connecting rod.

3. In a vending machine, the combination including an elongated delivery member, storage means adapted to store a plurality of articles to be vended, means for shifting articles from said storage means on to said delivery member, a plurality of fingers extending transversely across said elongated delivery member and spaced longitudinally therealong, a motor linked to said fingers for reciprocating said fingers to advance articles along said delivery member, a push-off member carried by the foremost of said fingers, and means for extending said push-off member longitudinally of said elongated delivery member as said fingers reach their foremost limit of reciprocation to push an article off of said delivery member.

4. In a vending machine, the combination of a stationary storage tray adapted to hold a plurality of articles, a delivery tray arranged transversely of said storage tray, means for shifting articles along said storage tray and onto said delivery tray, a plurality of article moving members extending across said delivery tray, said article moving members being reciprocal longitudinally relative to said delivery tray and periodically shiftable away from said delivery tray to advance articles one by one therefrom, motor means for driving said article moving members and said means for shifting articles on said storage tray, article detecting means extending longitudinally of said delivery tray, and operating circuit means for said motor means including means actuated by said article detecting means selectively to drive said article moving members or the means for advancing articles from said storage tray on to said delivery tray.

5. In a mechanically operated coin actuated vending machine, the combination including a horizontally extending storage member, a horizontally extending delivery member in substantially the same horizontal plane as said storage member and at right angles thereto, means for advancing articles longitudinally of said storage member and from said storage member on to said delivery member, a rotatable delivery drum having a plurality of article receiving recesses, means for advancing articles longitudinally of said delivery member and from said delivery member into one of the recesses of said drum, motor means for driving said last named advancing means, means operating in timed relation with said delivery means to rotate said drum to shift a recess from article receiving position adjacent said delivery means to a position accessible to a purchaser, means for periodically clutching said motor means to said storage advancing means, and coin responsive automatically actuated means for controlling the operation of said motor means.

6. In a vending machine, the combination comprising article delivery means, article storage means, means for shifting articles from said storage means to said article delivery means, an electric motor, first clutch means when engaged interconnecting said motor and said article delivery means, second clutch means when engaged interconnecting said motor and said article shifting means, a coin actuated switch, means actuated by closing of said coin actuated switch to energize said motor and to engage said first clutch means to drive said article delivering means, and means to detect the absence of articles on said article delivering means and operable to engage said second clutch means upon detection of the absence of articles on said article delivery means to drive said article shifting means.

7. In a vending machine, the combination comprising article delivery means, article storage means, means for shifting articles from said storage means to said article delivery means, an electric motor, first clutch means when engaged interconnecting said motor and said article delivery means, second clutch means when engaged interconnecting said motor and said article shifting means, a coin actuated switch, means actuated by closing of said coin actuated switch to energize said motor for a first predetermined time and to engage said first clutch means for a second and shorter predetermined time less than said first predetermined time to drive said article delivering means, and means to detect the absence of articles on said article delivering means to engage said second clutch means after disengagement of said first clutch means to drive said article shifting means.

8. In a vending machine, the combination comprising an elongated stationary delivery member, a stationary storage shelf, means for shifting articles from said storage shelf on to said elongated delivery member, a plurality of longitudinally spaced fingers extending transversely across said delivery member, a rotatable drum having a plurality of article receiving recesses, means for oscillating said fingers to shift articles one by one from said delivery member into said drum, and an actuating member oscillatable in timed relation with said fingers to rotate said drum through a predetermined angle to shift a recess from article receiving position adjacent said delivery member to a position accessible to a vendee to deliver an article to a vendee.

9. In a vending machine, the combination comprising elongated stationary delivery means, a stationary storage shelf, means for shifting articles from said storage shelf on to said elongated delivery means, a rotatable drum having a plurality of article receiving recesses at one end of said delivery means, means for advancing articles on said delivery means to shift articles one by one from said delivery means into one of said article receiving recesses of said drum, spring means for rotating said drum and means operable in timed relation with said article advancing means to cock said spring means to rotate said drum through a predetermined angle to shift a recess from article receiving position adjacent said delivery means to a position accessible to a vendee to deliver an article to a vendee.

10. In a vending machine, the combination comprising elongated stationary delivery means, a stationary storage shelf, means for shifting articles from said storage shelf on to said elongated delivery means, a rotatable drum having a plurality of article receiving recesses at one end of said delivery means, means for locking said drum against rotation, means for advancing articles on said delivery means to shift articles one by one from said delivery means into one of the recesses of said drum, spring means for rotating said drum, and means operable in timed relation with said article advancing means to cock said spring means and release said locking means to rotate said drum through a predetermined angle to shift a recess from article receiving position adjacent said delivery means to a position accessible to a vendee to deliver an article to a vendee.

11. In a vending machine, the combination including an elongated delivery member, storage means adapted to store a plurality of articles to be vended, means for shifting articles from said storage means on to said delivery member, longitudinally reciprocating means for shifting articles to be vended along said delivery member, a push-off member carried by the forward end of said reciprocating means, and means for extending said push-off member longitudinally of said elongated delivery member as said reciprocating means reaches the foremost limit of reciprocation thereof to push an article off of said delivery member.

12. A vending machine comprising a delivery shelf, first means for shifting articles to be vended longitudinally along said delivery shelf, first detecting means to detect the presence of articles on said delivery shelf, a storage shelf arranged laterally of said delivery shelf and adapted to support a plurality of articles to be vended, second means for shifting a predetermined number of articles to be vended from said storage shelf on to said delivery shelf, second detecting means to detect the presence of articles to be vended on said storage shelf, a drive motor, and means for connecting said drive motor to said first article shifting means when said first detecting means indicates the presence of articles on said delivery shelf and to connect said drive motor to said second article shifting means when said first detecting means indicates the absence of articles on said delivery shelf and to render said drive motor inoperative when both said detecting means indicate the absence of articles on said delivery and storage shelves.

13. A vending machine comprising a delivery shelf, first means for shifting articles to be vended longitudinally along said delivery shelf, first detecting means to detect the presence of articles on said delivery shelf, a storage shelf arranged laterally of said delivery shelf and adapted to support a plurality of articles to be vended, second means for shifting a predetermined number of articles to be vended from said storage shelf on to said delivery shelf, second detecting means to detect the presence of articles to be vended on said storage shelf, a drive means, means for connecting said drive motor to said first article shifting means when said first detecting means indicates the presence of an article on said delivery shelf, and means to connect said drive motor to said second article shifting means immediately after operation of said first article shifting means when said first article detecting means indicates the absence of articles to be vended on said delivery shelf and said second detecting means indicates presence of articles on said storage shelf.

14. A vending machine comprising a fixed delivery shelf, first means for shifting articles to be vended longitudinally along said fixed delivery shelf, first detecting means to detect the presence of articles on said fixed delivery shelf, a fixed storage shelf arranged laterally of said delivery shelf and adapted to support a plurality of articles to be vended, second means for shifting a predetermined number of articles to be vended from said storage shelf on to said delivery shelf, a second detecting means to detect the presence of articles to be vended on said storage shelf, a drive motor, and means for connecting said drive motor to said first article shifting means when said first detecting means indicates the presence of articles on said delivery shelf and to connect said drive motor to said second article shifting means when said first detecting means indicates the absence of articles on said delivery shelf and to render said drive motor inoperative when both said detecting means indicate the absence of articles on said fixed delivery and storage shelves.

References Cited in the file of this patent

UNITED STATES PATENTS

| | | |
|---|---|---|
| Re. 23,103 | Newcomer | Apr. 26, 1949 |
| 1,132,343 | Heybach | Mar. 16, 1915 |
| 1,358,388 | Neibel | Nov. 9, 1920 |
| 1,457,300 | Cohen | June 5, 1923 |
| 1,718,249 | Morin | June 25, 1929 |
| 1,984,997 | Smith | Dec. 18, 1934 |
| 1,986,714 | Clayton | Jan. 1, 1935 |
| 2,253,447 | Stanford | Aug. 19, 1941 |
| 2,282,269 | Tone | May 5, 1942 |
| 2,323,981 | DuGrenier | July 13, 1943 |
| 2,590,736 | Tandler | Mar. 25, 1952 |
| 2,621,774 | Rourke | Dec. 16, 1952 |
| 2,632,681 | Newcomer | Mar. 24, 1953 |

UNITED STATES PATENT OFFICE
CERTIFICATION OF CORRECTION

Patent No. 2,978,085            April 4, 1961

Robert D. Stayton et al.

It is hereby certified that error appears in the above numbered patent requiring correction and that the said Letters Patent should read as corrected below.

Column 12, line 67, for "radical" read -- radial --; column 15, line 33, strike out "a", first occurrence; column 20, line 41, for "1934b" read -- 1034b --; column 23, line 8, for "institued" read -- instituted --; column 27, line 29, for "means", first occurrence, read -- motor --.

Signed and sealed this 5th day of September 1961.

(SEAL)
Attest:

ERNEST W. SWIDER            DAVID L. LADD
Attesting Officer            Commissioner of Patents